US012367641B2

(12) United States Patent
Yang et al.

(10) Patent No.: US 12,367,641 B2
(45) Date of Patent: Jul. 22, 2025

(54) ARTIFICIAL INTELLIGENCE DRIVEN PRESENTER

(71) Applicant: Microsoft Technology Licensing, LLC, Redmond, WA (US)

(72) Inventors: Chenguang Yang, Seattle, WA (US); Michael Louis Urciuoli, Seattle, WA (US); Max Wang, Seattle, WA (US); Faryal Ali Khan, Seattle, WA (US); Xuan Li, Bellevue, WA (US); Qing Dai, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 18/310,858

(22) Filed: May 2, 2023

(65) Prior Publication Data

US 2024/0371089 A1 Nov. 7, 2024

(51) Int. Cl.
*G06F 40/20* (2020.01)
*G06T 17/00* (2006.01)
*G10L 13/04* (2013.01)

(52) U.S. Cl.
CPC .............. *G06T 17/00* (2013.01); *G10L 13/04* (2013.01)

(58) Field of Classification Search
CPC .......... G06F 40/00; G06F 40/20; G06F 40/56; G06F 40/40; G06F 40/35; G06F 40/30; G06F 16/4393; G06F 16/3329; G06F 40/186; G06T 13/205; G06T 13/40; G06T 17/00; G10L 13/00; G10L 15/18
See application file for complete search history.

(56) References Cited

U.S. PATENT DOCUMENTS

| 12,167,169 | B1 * | 12/2024 | Ganju | H04N 7/157 |
| 2024/0256764 | A1 * | 8/2024 | Maschmeyer | G06F 16/3328 |
| 2024/0331681 | A1 * | 10/2024 | Iyer | G10L 13/033 |

FOREIGN PATENT DOCUMENTS

WO 2023002300 A1 1/2023

OTHER PUBLICATIONS

International Search Report and Written Opinion received for PCT Application No. PCT/US2024/025070, Sep. 9, 2024, 12 pages.

(Continued)

*Primary Examiner* — Hau H Nguyen
(74) *Attorney, Agent, or Firm* — NovoTechIP International PLLC

(57) ABSTRACT

A data processing system implements obtaining presentation content for a presentation, the presentation content including a set of slides and a transcript. The system further implements obtaining presentation style information for the presentation from a presentation datastore, generating a prompt for a LLM that includes the transcript and the presentation style information to cause the first LLM to generate an augmented transcript by rewriting the textual cues of the first transcript into a conversational style associated with the presentation style identified in the presentation style information; generating audiovisual content by generating speech for a virtual presenter and generating audiovisual content synchronizing an animation of the virtual presenter with the first audio content, and sending the audiovisual content to the computing devices of users who are in an audience of the presentation.

20 Claims, 17 Drawing Sheets

(56) References Cited

OTHER PUBLICATIONS

Seron, et al., "MaxinePPT= Using 3D Virtual Characters for Natural Interaction", 2nd International Workshop on Ubiquitous Computing & Ambient Intelligence, Sep. 30, 2007, 10 Pages.

Welbergen, et al., "Presenting in Virtual Worlds: Towards an Architecture for a 3D Presenter Explaining 2D-Presented Information", Intelligent Technologies for Interactive Entertainment: First International Conference, Jan. 1, 2005, pp. 203-212.

* cited by examiner

FIG. 4H

ARTIFICIAL INTELLIGENCE DRIVEN PRESENTER

BACKGROUND

Generating presentation content often includes drafting textual content, selecting imagery, and laying out this textual content and imagery in a manner that provides a compelling and interesting content for the intended audience of the presentation. Once the content has been generated, presenting the presentation to the intended audience is still a labor intensive and sometimes stressful experience. Hence, there is a need for improved systems and methods of providing an artificial intelligence (AI) driven presenter that can automatically present the presentation content on behalf of the presentation creator.

SUMMARY

An example data processing system according to the disclosure may include a processor and a machine-readable medium storing executable instructions. The instructions when executed cause the processor to perform operations including obtaining presentation content for a presentation, the presentation content comprising a first set of slides and a transcript of the presentation content, the transcript comprising textual cues for a presenter associated with each of the slides; obtaining presentation style information for the presentation from a presentation datastore, the presentation style information providing an indication of a presentation style to be utilized by a virtual presenter when presenting the presentation content to an audience of the presentation; generating a first prompt for a first large language model (LLM) that includes the transcript and the presentation style information to cause the first LLM to generate an augmented transcript by rewriting the textual cues of the transcript into a conversational style associated with the presentation style identified in the presentation style information; providing the first prompt as an input to the first LLM to obtain the augmented transcript; receiving an indication from a first presentation director interface to begin streaming audiovisual presentation content to a plurality of computing devices of the audience of the presentation; generating the audiovisual presentation content by: providing the augmented transcript to a text-to-speech model to generate first audio content comprising synthesized speech for the virtual presenter; providing the first audio content and a three-dimensional (3D) model of the virtual presenter to a video synthesizer to cause the video synthesizer to generate video content synchronizing an animation of the virtual presenter with the first audio content; and obtaining the video content from the video synthesizer; and streaming the audiovisual presentation content comprising the first audio content and the first animation content to the plurality of computing devices of the audience of the presentation.

An example data processing system according to the disclosure may include a processor and a machine-readable medium storing executable instructions. The instructions when executed cause the processor to perform operations including receiving an electronic document comprising first textual content; automatically analyzing the electronic document using a first large language model (LLM) configured to generate presentation content from the electronic document, the presentation content comprising a set of slides and a transcript of the presentation content, the transcript comprising textual cues for a presenter associated with each of the slides; obtaining presentation style information for the presentation from a presentation datastore, the presentation style information providing an indication of a presentation style to be utilized by a virtual presenter when presenting the presentation content to an audience of the presentation; generating a first prompt for a second LLM that includes the transcript and the presentation style information to cause the second LLM to generate an augmented transcript by rewriting the textual cues of the transcript into a conversational style associated with the presentation style identified in the presentation style information; providing the first prompt as an input to the second LLM to obtain the augmented transcript; receiving an indication from a first presentation director interface to begin streaming audiovisual presentation content to a plurality of computing devices of an audience of the presentation; generating the audiovisual presentation content by: providing the augmented transcript to a text-to-speech model to generate first audio content comprising synthesized speech for the virtual presenter; providing the first audio content and a three-dimensional (3D) model of the virtual presenter to a video synthesizer to cause the video synthesizer to generate video content synchronizing an animation of the virtual presenter with the first audio content; and obtaining the video content from the video synthesizer; and streaming the audiovisual presentation content comprising the first audio content and the first animation content to the plurality of computing devices of the audience of the presentation.

An example method implemented in a data processing system automatically presenting presentation content includes obtaining presentation content for a presentation, the presentation content comprising a first set of slides and a transcript of the presentation content, the transcript comprising textual cues for a presenter associated with each of the slides; obtaining presentation style information for the presentation from a presentation datastore, the presentation style information providing an indication of a presentation style to be utilized by a virtual presenter when presenting the presentation content to an audience of the presentation; generating a first prompt for a first large language model (LLM) that includes the transcript and the presentation style information to cause the first LLM to generate an augmented transcript by rewriting the textual cues of the transcript into a conversational style associated with the presentation style identified in the presentation style information; providing the first prompt as an input to the first LLM to obtain the augmented transcript; receiving an indication from a first presentation director interface to begin streaming audiovisual presentation content to a plurality of computing devices of the audience of the presentation; generating the audiovisual presentation content by: providing the augmented transcript to a text-to-speech model to generate first audio content comprising synthesized speech for the virtual presenter; providing the first audio content and a three-dimensional (3D) model of the virtual presenter to a video synthesizer to cause the video synthesizer to generate video content synchronizing an animation of the virtual presenter with the first audio content; and obtaining the video content from the video synthesizer; and streaming the audiovisual presentation content comprising the first audio content and the first animation content to the plurality of computing devices of the audience of the presentation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4A-4H are diagrams of example user interfaces of a presentation application that incorporates the techniques provided herein to provide an AI-driven presenter.

DETAILED DESCRIPTION

Figure 1A:
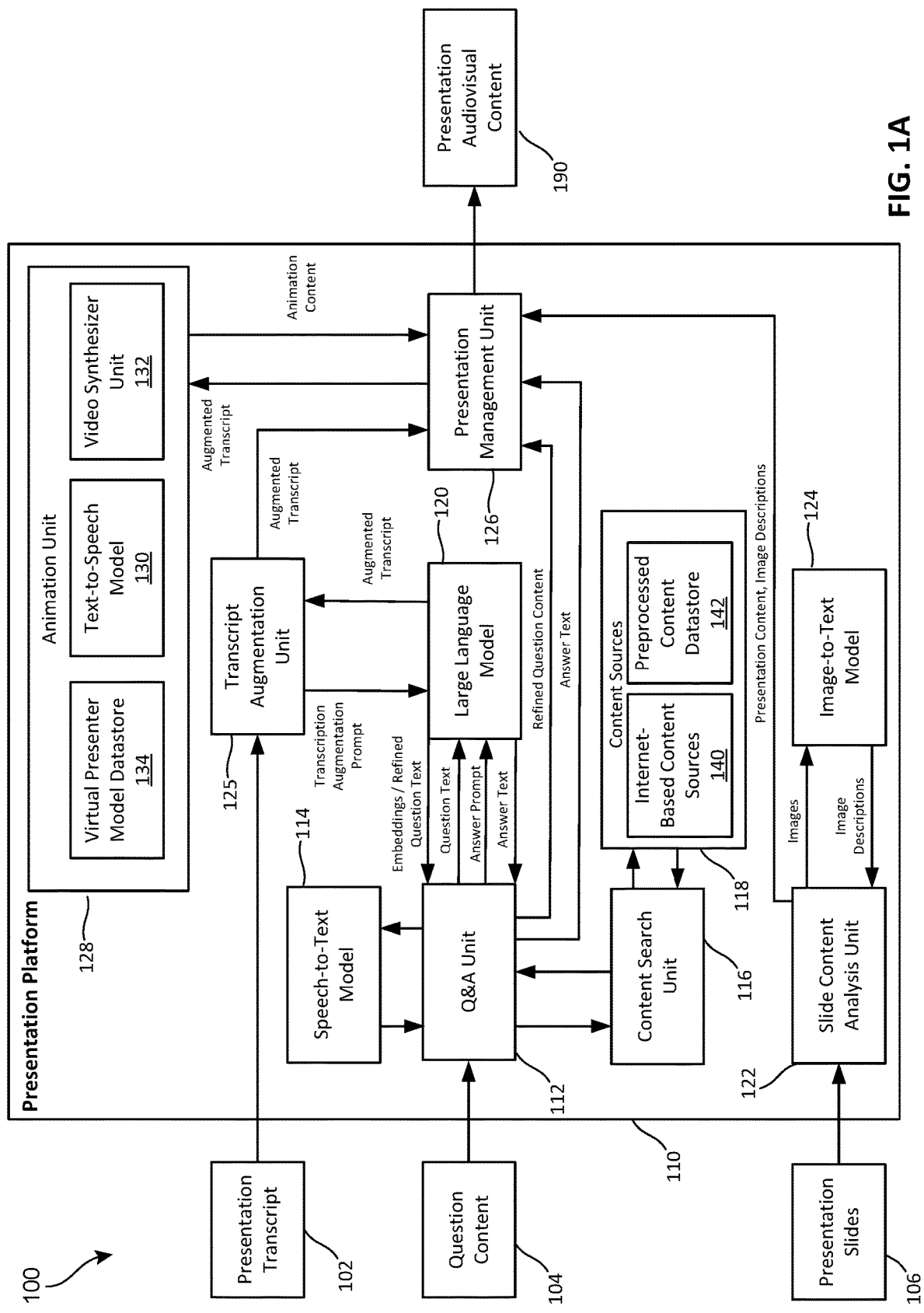
FIGS. 1A and 1B are diagrams showing aspects of an example computing environment in which the techniques for providing an AI-driven presenter described herein may be implemented.

Techniques for providing an artificial intelligence (AI) driven presenter are provided. These techniques provide tools for automatically presenting presentation content using a virtual presenter. These techniques address the technical problems associated with current automatic presentation techniques, which are limited to the user presenting the presentation on a livestream to an audience or prerecording the presentation content in advance and streaming the prerecorded presentation content to the user. Many people are uncomfortable with presenting before an audience, and manually generating and presenting the presentation is very labor intensive. However, prerecording the presentation content creates static presentation content that does not provide members of the audience to ask questions. The techniques herein address these technical problems and additional technical problems discussed herein.

These techniques can be implemented in a presentation platform that enables users to create and/or modify presentation content and present the presentation content to a remote audience and/or an audience that is physically present at the same location as the presenter. These techniques can also be implemented in a communications platform, a collaboration platform, or other such platforms that enable the user to communication with and share content with other users who may be located remotely from the user presenting the content.

The virtual presenter can automatically present presentation content that includes slides and a transcript of the slide to narrate the slide content. In some implementations, the presentation platform automatically generates the slide content and the transcript from a set of documents provided by the user. In other implementations, a user authors the slides and/or collaborates with an LLM to generate the slide content, and the transcript is automatically generated from the slide content. The system provides tools that enable the user to specify various attributes about the presentation and the presentation style that should be used by the virtual presenter to present the content. The transcript is automatically augmented to rephrase the content to be spoken by the virtual presenter and/or to add emotion indicators that indicate a gesture and/or expression that the virtual presenter should emulate at particular times throughout the presentation. The LLM rephrases the transcript to reflect a particular personality associated with the type of presentation and/or personality for the virtual presenter selected by the user. A technical benefit of this approach is that the audio portion of the presentation can be generated from the augmented transcript using text-to-speech models in real-time during the presentation and the virtual avatar automatically animated to generate video of the virtual avatar appearing to speak this audio content that is generated.

Another technical benefit of generating the audiovisual content of the virtual avatar in substantially real-time during the presentation is that virtual avatar can respond to questions from audience members participating in the presentation. The techniques herein also provide for real-time question and answering sessions during the presentation. In some implementations, the questions are input by users in a chat or messaging window associated with the presentation. In other implementations, the questions are spoken by users and translated into textual content using a speech-to-text model configured to convert the spoken questions to text. The question text is refined using an LLM and used to formulate a search query for content associated with the presentation, content in an enterprise or organization-specific data store, and/or from Internet-based content sources. The results of the search query are summarized using an LLM and ranked for relevance to the query. An answer to a question is generated in the chat or messaging window based on the highest ranked search result or results in some implementations. In other implementations, the presentation by the virtual presenter can be halted and the virtual avatar verbalizes the question and at least a portion of the answer to the question before continuing the presentation. A technical benefit of this approach is that the user experience and user engagement is improved by enabling the virtual assistant to respond to questions during the presentation in a similar manner as a human presenter.

The techniques provided herein utilize models that have translation capabilities in some implementations. In such implementations, the presentation content may be in a first language and the user may specify a second language in which the presentation content is to be presented by the virtual avatar. A technical benefit of this approach is that the user can generate a presentation for an audience that does not speak and/or read the language of the presentation content nor does the user need to be able to speak in the language in which the presentation is presented to the audience. Furthermore, the user may also automatically generate the presentation content from a content source in a language that the user does not know so that the user can obtain a summary of the content source in a language with which the user is familiar. These and other technical benefits of the techniques disclosed herein will be evident from the discussion of the example implementations that follow.

FIG. 1A is a diagram shown an example computing environment 100 in which the techniques for providing a virtual presenter discussed herein may be implemented. The presentation platform 110 is configured to facilitate creation of presentation content and presenting the presentation content to a local and/or remote audience using a virtual presenter. FIG. 1 provides details of the features of the presentation platform 110 that support the virtual presenter.

Figure 1B:
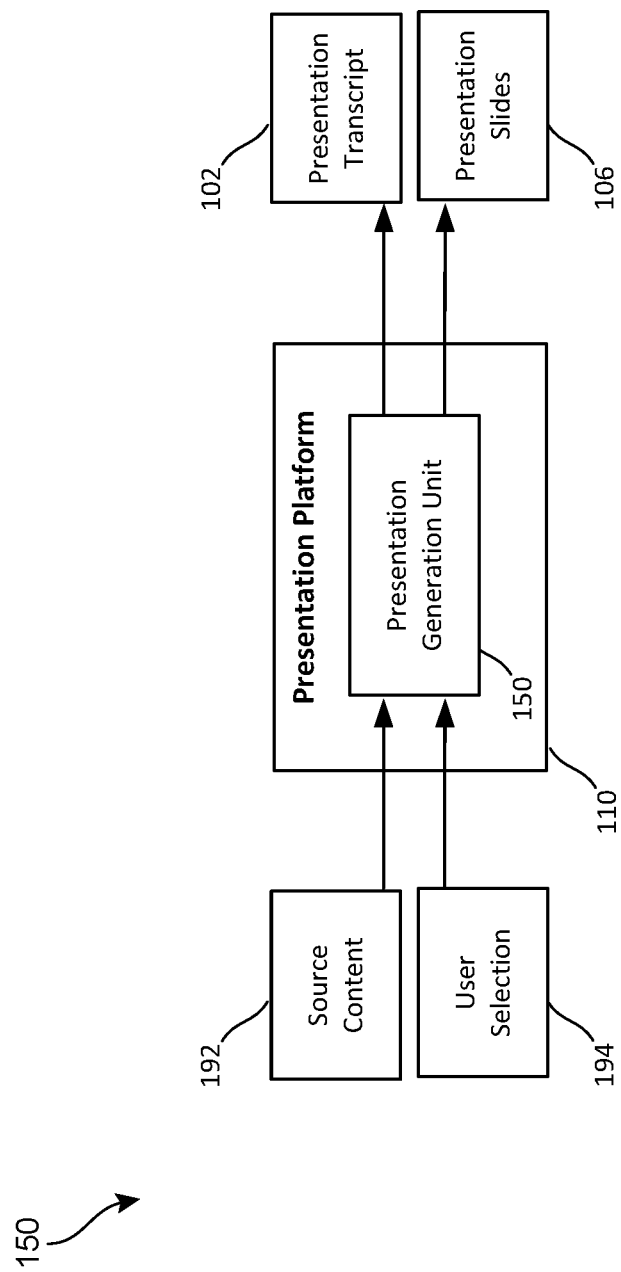

The presentation platform 110 has three inputs in the example implementation shown in FIG. 1. These inputs includes the presentation content, which includes the presentation slides 106 and the presentation transcript 102. The inputs also include the question content 104, which includes questions presented by audience members during the presentation. The presentation slides 106 may include text and/or imagery. The presentation transcript 102 includes textual cues for a presenter associated with each of the slides. As will be discussed in detail in the examples which follow, the presentation slides 106 and the presentation transcript 102 are automatically generated by the presentation platform 110 based on source content provided by the user in some instances, such as in the example implementation shown in FIG. 1B. In other instances, the user authors the presentation slides 106 manually and/or in collaboration with another user and/or an LLM.

The presentation slides 106 are provided as an input to the slide content analysis unit 122. The slide content analysis unit 122 identifies images included in the slides and provides those images to the image-to-text model 124 for analysis. The image-to-text model 124 is trained to receive an image and to provide a textual description of the content of the image. The slide content analysis unit 122 can provide the slides and the description of the images included in the slides to the presentation management unit 126. The presentation management unit 126 manages the various content used to generate the audiovisual representation of the virtual presenter.

The presentation transcript 102 is provided as an input to the transcript augmentation unit 125. The presentation transcript 102 includes textual cues associated with each of the presentation slides 106. A human or virtual presenter could use these prompts to describe each of the slides. The transcript augmentation unit 125 utilizes the Large Language Model (LLM) 120 to generate an augmented version of the transcript that rewrites these prompts to have a particular presentation style that should be used by the virtual presenter to present the content. In some implementations, the LLM 120 is a Generative Pre-trained Transformer model, such as but not limited to the GPT-3 or GPT-4 models. The user configuring the virtual presenter may select the presentation style for a particular presentation. In some implementations, the user may select from a predetermined set of presentation styles that have specific attributes that will be included in the prompt provided to the LLM 120 when generating the augmented transcript. In a non-limiting example, these presentation styles include a storyteller style and a connector style. The storyteller presentation style uses a story or stories to connect to the overall topic of the presentation, while the connector style includes questions encouraging audience feedback and engagement. These are merely two examples of the types of styles that can be supported by presentation platform 110. Each of these styles may be associated with a short description of the style that is included in the prompt to the LLM 120.

The transcript augmentation unit 125 also prompts the LLM 120 to add emotion indicators to the augmented transcript that indicate a gesture and/or expression that the virtual presenter should emulate at particular times throughout the presentation. Adding these indicators to the transcript improve the user engagement by causing the virtual presenter to react to the presentation content in an engaging and interesting manner. The transcript augmentation unit 125 provides the augmented transcript to the presentation management unit 126.

The presentation management unit 126 also provides the augmented transcript to the animation unit 128, which generates the presentation audiovisual content 190 which includes an audio component which is the synthesized speech of the virtual presenter and a video component which is an animation of the virtual presenter that is lip synced to the synthesized speech. The virtual presenter model datastore 134 includes the 2D and/or 3D models of virtual presenters that can be selected by the user when configuring the virtual presenter for the presentation. The selected model from the virtual presenter model datastore 134 is provided to the video synthesizer unit 132.

The text-to-speech model 130 is a natural language processing (NLP) trained to analyze the augmented transcript and to output the audio content as synthesized speech. The text-to-speech model 130 may receive the presentation style information and the selected model for the virtual presenter as inputs, in some implementations, to provide the model 130 with context as to how the synthesized speech should sound. The audio content output by the model 130 is provided to the video synthesizer unit 132.

The video synthesizer unit 132 receives the augmented transcript, the selected model of the virtual presenter, and the audio content of the synthesized speech as inputs. The video synthesizer unit 132 animates the model of the virtual presenter according to the audio content of the synthesized speech and the emotion indicators included in the augmented transcript. The video synthesizer unit 132 generates lip synced animations and generates facial expressions based on the augmented transcript and the synthesized speech corresponding to the augmented transcript. The video synthesized by the video synthesizer unit 132 is provided to the presentation management unit 126 which streams the video as the presentation audiovisual content 190 to the computing devices of the users in the audience of the presentation. Examples of the user interfaces of the computing device of the presenter and the users in the audience are described in greater detail with respect to FIGS. 4A-4H.

The Q&A unit 112 supports real-time question and answering capabilities during a presentation. The Q&A unit 112 takes questions from either speech-to-text or text chat as input and outputs answers for the virtual presenter to deliver during the presentation. The answers can be presented in Q&A breaks during the presentation or asynchronously in the chat associated with the presentation. The Q&A unit 112 first treats a question as a message and the LLM 120 is used to determine whether the message is indeed a question and is on topic. Non-questions or questions that are off topic are ignored by the Q&A unit 112 and may, in some implementations, be discarded rather than being included in the chat or answered by the virtual presenter The Q&A unit 112 also utilizes the LLM 120 to refine the question text by rephrasing the question, correcting any grammatical or spelling errors, removing rude or improper speech, and summarizing long questions. The refined or rephrased question text is passed through the GPT embeddings function of the LLM 120 to obtain question embeddings.

The Q&A unit 112 provides the embeddings to the content search unit 116 for comparison to a preprocessed database of offline files attached to the presentation, which is referred to herein as the preprocessed content datastore 142. These files can include the presentation slides, one or more source documents used to generate the presentation slides, and any files that have been manually associated with the presentation. The embeddings for the content in the preprocessed content datastore 142 have already been determined and are compared to the question embeddings to identify relevant content from the preprocessed content datastore 142.

The content search unit 116 also sends the refined question text to a search engine to search for content from Internet-based content sources 140. In some implementations, the search engine is Microsoft Bing, but other implementations may utilize other search engines. The Internet-based content sources 140 may be websites, blog posts, and/or other sources of information accessible and searchable on the Internet. The content search unit 116 provides the search results obtained from the Internet-based content sources 140 to the Q&A unit 112, which submits the search results to the LLM 120 to obtain summaries of the search results. The Q&A unit 112 then passes the search results through the embedding function of the LLM 120 to obtain embeddings for each of the search results. The Q&A unit compares the question embeddings with the search results embeddings to determine which search results are most relevant.

The Q&A module ranks the search results from the Internet-based content sources and the preprocessed content datastore 142 based on the distance between the query embeddings and the respective embeddings of each of the search results. The most relevant R results are included in the answer prompt to the LLM 120 to provide context to the LLM 120 when generating the answer to the question. The answer text is received from the LLM 120. The answer tax may be added to the chat and/or presented by the virtual presenter. Where the virtual presenter is to present the answer during the presentation, the answer text may be augmented by the transcript augmentation unit 125 before being passed to the animation unit 128 to generate the animation of the virtual presenter. The Q&A unit 112 can be configured to operate in a moderator mode, in which a human moderator can approve or reject the answers. Additional details associated with such moderation are discussed with respect to FIG. 4F.

The question content 104 includes question text and/or audio of spoken questions received from the computing devices of audience members during the presentation. The Q&A unit 112 provides questions received as audio content to the speech-to-text model 114 for processing. The speech-to-text model 114 is an NLP model trained to analyze audio content that includes speech and to output the speech as text. The Q&A unit 112 takes the text of the questions and formulates a prompt to the LLM 120 that requests that the model rephrase the question into more refined question text. The Q&A unit 112 also obtains embeddings representing the refined question text from the LLM 120. The Q&A unit 112 provides the refined question text and the embeddings to the content search unit 116.

FIG. 1B is a diagram showing an example computing environment 150 showing additional details of the presentation platform 110 shown in 110. In the example implementation shown in FIG. 1B, the presentation platform 110 also includes a presentation generation unit 150. The presentation generation unit 150 implements techniques for transforming content across visual mediums using artificial intelligence and user-generated media. The presentation generation unit 150 implements AI-assisted content generation and design tools that consider user preference for AI-generated media or user-generated media when producing transformed content from source content 192. In some implementations, the source content 192 includes electronic documents, web pages, and/or other types of electronic content that includes text and/or images from which a user would like to automatically generate a slide presentation. The presentation generation unit 150 considers document attributes, content subject matter, and artistic design factors to automatically create visually compelling slides for the presentation. These presentation generation unit 150 considers the user's intent and/or direction when creating the slides. Additional considerations, such as but not limited to historic documents that are similar in content, design, and/or use case may also be considered in some implementations. The presentation generation unit 150 implements the techniques described in U.S. patent application Ser. No. 18/161,485 entitled "Transforming Content Across Visual Mediums Using Artificial Intelligence and User Generated Media" filed on Jan. 30, 2023, which is incorporated herein by reference.

The presentation generation unit 150 also generates a presentation transcript 102. The presentation generation unit 150 utilizes a transcript generation model to analyze the presentation slides 106, the source content 192 or the user selection 194, and generate the presentation transcript 102. The transcript generation model is implemented by an LLM in, and the LLM is a GPT model in some implementations. The presentation transcript 102 is divided up into segments that are included in a notes section of the slides of the presentation slides 106 in some implementations. In some implementations, the transcript generation model is provided a target presentation time as an input, and the transcript generation model is configured to generate a transcript that should take an average presenter the target presentation time to read through the transcript during a presentation. In some examples, the transcript generation model is also configured to receive feedback from presenters to tailor the transcripts generated to the speed which the user typically presents so that the model can more accurately generate a transcript of an appropriate length for the presenter. The transcript generation model is implemented using a GPT-3 model that has been finetuned to generate the text of transcript in some implementations. In other implementations, other types of models are used to implement the transcript generation model.

The source content 192 may include both textual content and/or images. The source content 192 is electronic content, such as but not limited to word processing documents, spreadsheets, web pages, and/or other types of documents. In some implementations, the source content 192 is identified using a Universal Resource Locator (URL) or other type of link or address indicating where the source content 192 may be obtained from. The user selection may be a selection of a portion of the source content 192 or another electronic content. The user selection 194 may include a section of the source content 192 or other electronic content that has been highlighted or otherwise identified by the user. The user selection 194 may include one or more sentences, paragraphs, sections, pages, or other portions of the source content 192 or other electronic content. In some implementations, the source content 192 and/or the user selection 194 is in a first language but the user specifies a second language in which the presentation slides 190 are to be generated. The models used by the transformation stage 130 are configured to translate the textual content from the source content 192 and/or the user selection 194 into the second language.

In some implementations, a third input (not shown) may be provided. The third input is presentation content that has already been created either automatically using the techniques described herein and/or is user-generated slide content. In such implementations, the user may select the source content 192 and/or the user selection 194 from a source content to be used to automatically generate additional slides for the existing presentation. The transformation stage 130 and the design stage 170 consider the design attributes of the existing presentation when determining the design of the presentation content 190. These design attributes may include but are not limited to color scheme, slide layout, font and font attributes, and/or other attributes of the slides of the presentation slides 190.

Figure 2:
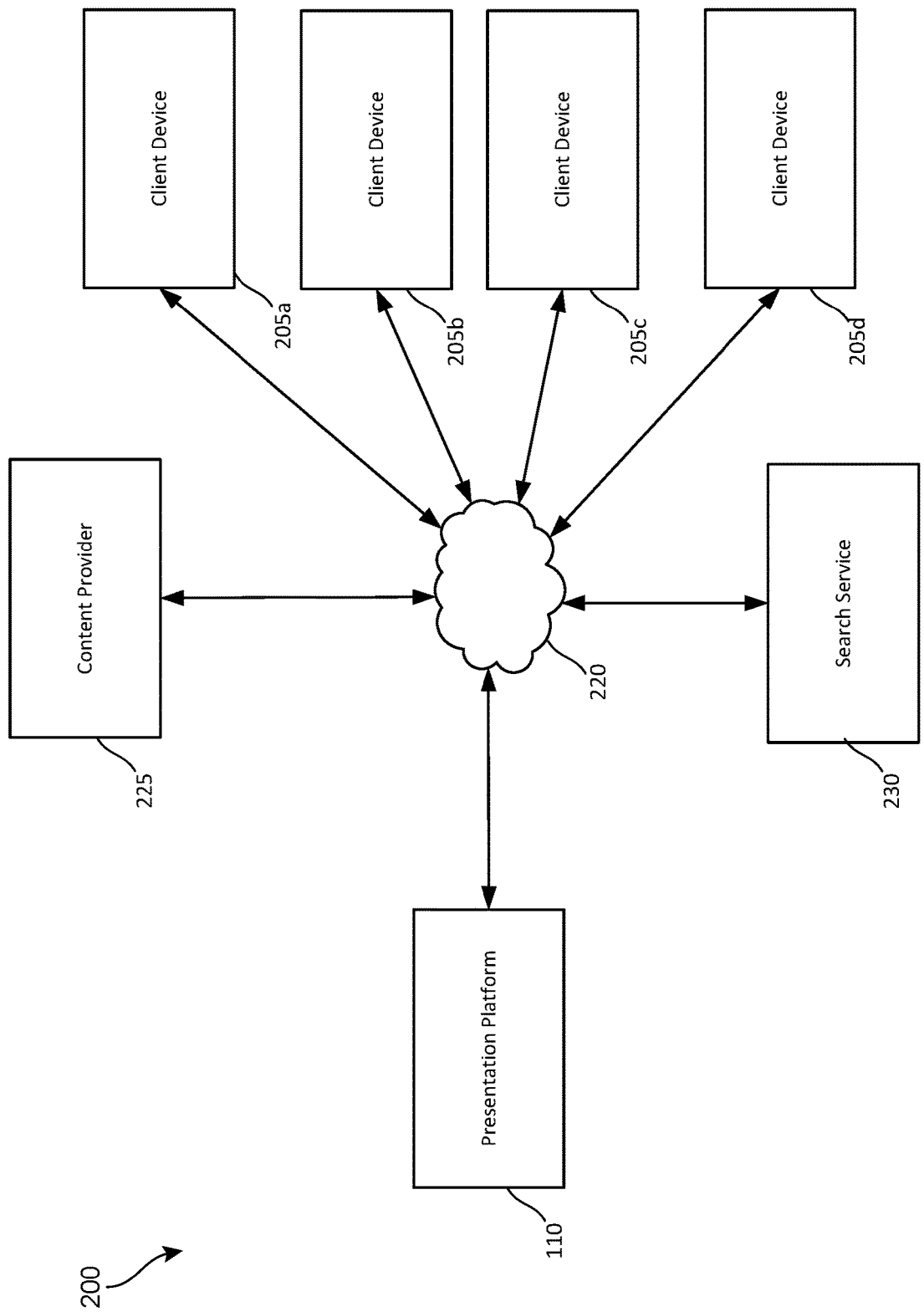
FIG. 2 is a diagram showing an example computing environment in which the AI presenter unit shown in FIG. 1 may be implemented.

FIG. 2 is a diagram showing an example computing environment 200 in which the techniques disclosed herein for automatically generating presentation content may be implemented. The computing environment 200 includes a presentation platform 110. The example computing environment 200 also includes client devices 205a, 205b, 205c, and 205d (collectively referred to as client device 205). The client devices 205a, 205b, 205c, and 205d communicate with the presentation platform 110, the content provider 225, and/or the search service 230 via the network 220. Furthermore, the presentation platform 110 communicates with the content provider 225 and/or the search service 230 via the network 220. The network 220 may be a combination of one or more public and/or private networks and may be implemented at least in part by the Internet.

In the example shown in FIG. 2, the presentation platform 110 is implemented as a cloud-based service or set of services. The presentation platform 110 is configured to facilitate creation of presentation content and presenting the presentation content to a local and/or remote audience. The presentation platform 110 utilizes the techniques provided herein to provide the users tools for automatically creating presentation content and for automatically presenting presentation content using a virtual presenter. The presentation platform 110 may be implemented by a presentation platform, such as but not limited to Microsoft PowerPoint Live®, which enables a presenter to present a presentation online and to invite users to view the presentation on their own devices. The presentation platform 110 may also be implemented by a communications platform, such as Microsoft Teams®, which provides an online hub for team collaboration including chat and video conferencing, or a collaboration platform, such as but not limited to Microsoft Loop®, which provides an environment for collaborating on the creation and consumption of content. Other presentation platforms, communications platforms, and/or collaboration platforms can utilize the techniques provided herein. A presenter may utilize such a presentation platform, communications platform, or collaboration platform to conduct a meeting, a lecture, a conference, or other such event online in which participants are able to communicate with the presenter as well as other participants via chat, audio and/or video conferencing. In such an online communications platform, a participant may serve as a presenter for part of an online communications session, while another participant may serve as a presenter for another part of the online. Furthermore, the virtual assistant provided herein can be used to present all or part of the presentation content during a presentation.

The content provider 225 provides textual and/or image content that may be selected as the source content in the presentation slides 106. The content provider 225 may provide one or more websites, web applications, and/or other sources of online content. While the example implementation shown in FIG. 2 includes a single content provider 225, the presentation platform 110 and/or the search service 230 may obtain content from multiple content providers 225 as well as from one or more content datastores provided on the presentation platform 110. The content provider 225 can be used to implement the Internet-based content sources 140 shown in FIG. 1, which are used by the presentation platform 110 as one of the potential sources for answer to questions posed by audience members during a presentation.

The search service 230 implements a search engine that is configured to receive search queries and to search for content on the content provider 225 and/or on content sources implemented on the presentation platform 110. The presentation platform 110 can use the search service 230 to search for textual and/or image content that may be included in the presentation slides 106 in implementations in which the user requests that the presentation platform 110 generate the presentation content. Furthermore, the presentation platform 110 can use the search service to search for answers to question that users have posed during the presentation from the content provider 225 and/or other Internet-based content sources or from other content sources maintained by the presentation platform.

The client devices 205a, 205b, 205c, and 205d may be used by a user to create presentation content themselves or in collaboration with an LLM. The client devices 205a, 205b, 205c, and 205d may be used by members of an audience of a presentation to receive presentation content, view the content, and participate in the presentation session. The user may also present the presentation themselves using their respective client device or configure the virtual presenter to present the presentation to audience members. The audience members may view the presentation content on their respective client devices and may pose spoken or text questions to the virtual presenter during the presentation. The client devices 205a, 205b, 205c, and 205d are each a computing device that may be implemented as a portable electronic device, such as a mobile phone, a tablet computer, a laptop computer, a portable digital assistant device, a portable game console, and/or other such devices. The client devices 205a, 205b, 205c, and 205d may also be implemented in computing devices having other form factors, such as a desktop computer, vehicle onboard computing system, a kiosk, a point-of-sale system, a video game console, and/or other types of computing devices. While the example implementation illustrated in FIG. 2 includes four client devices, other implementations may include a different number of client devices 205 that may utilize the presentation platform 110 to create and/or present presentation content. Furthermore, in some implementations, the application functionality provided by the presentation platform 110 is implemented by a native application installed on the client devices 205a, 205b, 205c, and 205d, and the client devices 205a, 205b, 205c, and 205d.

Figure 3:
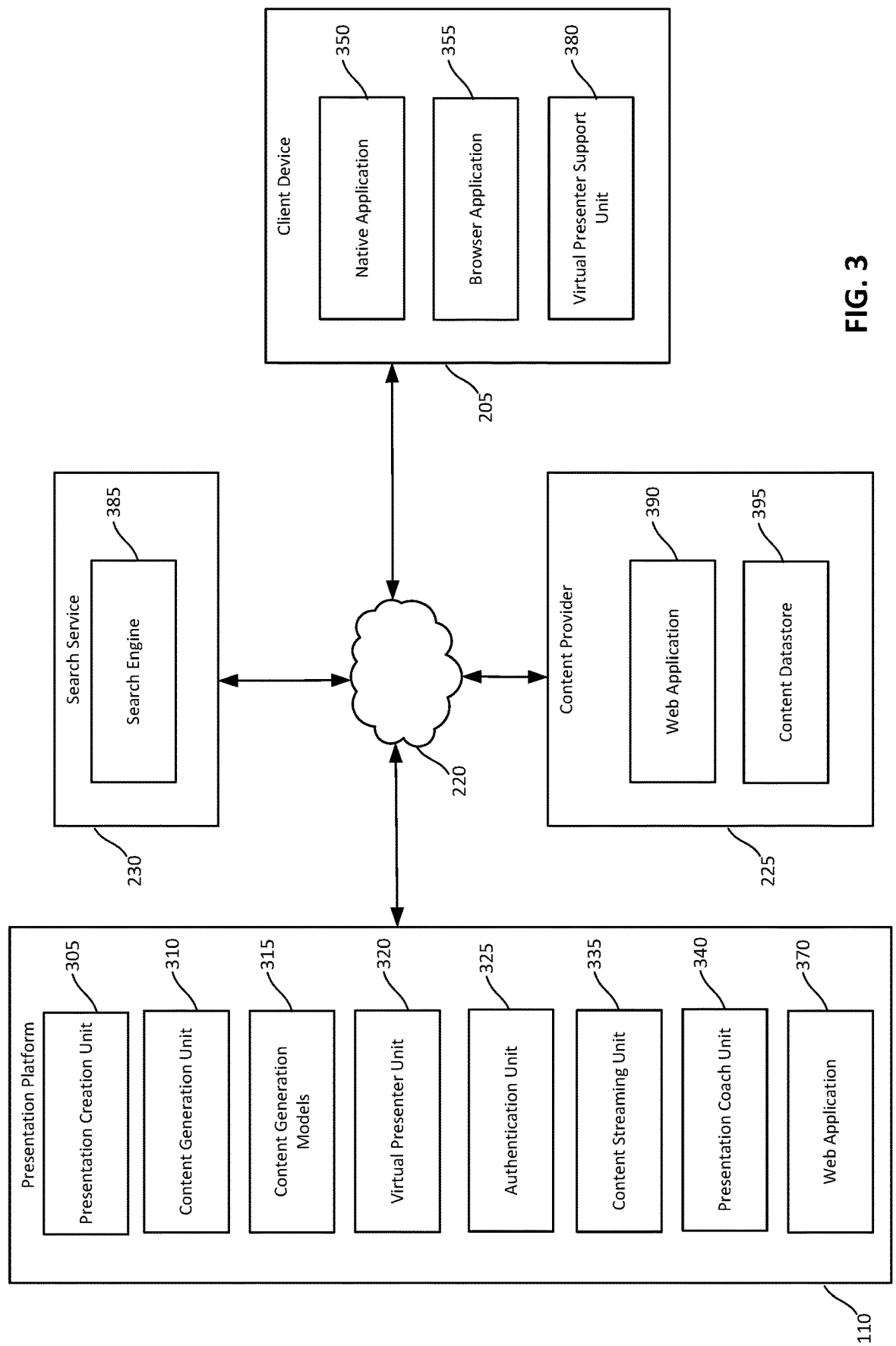
FIG. 3 is a diagram showing additional features of the presentation platform, the client device, the content provider, and the search service shown in FIG. 2.

FIG. 3 is a diagram showing additional features of the presentation platform 110, the client device 205, the search service 230, and the content provider 225. The presentation platform 110 includes a presentation creation unit 305, a content generation unit 310, content generation models 315, a virtual presenter unit 320, an authentication unit 325, a content streaming unit 335, a presentation coach unit 340, and a web application 370.

The presentation creation unit 305 provides tools that enable a user to create new presentation content and/or modify an existing presentation content. The presentation creation unit 305 enables the user to add textual content, imagery, and/or other content to the presentation content. In some implementations, the presentation platform implements a web application 370 that is accessible from the browser application 355 and/or the native application 350 of the client device 205.

The content generation unit 310 is configured to generate the presentation slides 106 from source documents in some implementations. The user may opt to have the presentation platform 110 generate the presentation content for them automatically rather than manually creating the slides for the presentation. The user can select one or more source documents to be analyzed and used to generate the presentation slides 106. The content generation unit 310 utilizes the content generation models 315 to transform the source content documents and/or a user selection of a portion of the one or more source documents into a format that can be utilized on the slides of the presentation slides 106. The content generation unit 310 also utilizes the content generation models 315 to create AI-generated imagery for at least some of the presentation slides 106 in some implementations. The content generation unit 310 utilizes an LLM of the content generation models 315 to generate the presentation transcript 102 from the presentation slides 106 in some implementations.

The virtual presenter unit 320 implements the functionality for processing the presentation slides 106, the presentation transcript 102, and the question content 104 to implement the various functions described with respect to FIG. 1.

The authentication unit 325 provides functionality for verifying whether users are permitted to access the services provided by the presentation platform 110. In some implementations, the authentication unit 325 provides functionality for receiving authentication credentials for the users from their respective client device 205. The authentication unit 325 may be configured to verify that the authentication credentials are valid and permit the users to access the services provided by the presentation platform 110 responsive to the authentication credentials being valid.

The content streaming unit 335 is used to stream audiovisual content, such as the presentation audiovisual content 190, associated with a presentation to a remote audience and/or to a computing device for presentation to an audience present at the same physical location as the presenter. In some implementations, the audiovisual content may be streamed to a projector, screen, or other peripheral device of the client device 205 of the presenter. The content streams may include audio and/or video streams of the presenter of a presentation or of the virtual presenter where the virtual presenter is used. The audio and/or video stream of the presenter may be captured by the client device 205 of the presenter and sent to the presentation platform 110. The virtual presenter support unit 380 provides means for capturing the audio and/or video streams of the virtual presenter in some implementations. The content streams may also include a video stream of the presentation content, such as the current slide of a presentation. The content streams are sent by the presentation platform to the client devices 205 of the audience. The presentation content may also be presented to a local audience through a projector or video screen that is configured to receive the presentation content from the client device 205 of the presenter and/or from the presentation platform 110.

The presentation coach unit 340 provides feedback for improving presenter skills and can be used to provide feedback to both human users and the virtual presenter. The presentation coach unit 340 provides useful feedback to presenters to improve their presentation skills. The presentation coach unit 340 utilizes one or more machine learning models to analyze audio and/or video content of the presentation to identify aspects of the presentation that the presenter may be able to improve and to highlight aspects of the presentation which the presenter performed well. Critiques of various aspects of the presentation may be provided, such as, but not limited to pacing, vocal pattern, language usage, excessive wordiness, overly complex vocabulary, distracting behaviors, and/or other aspects of the presentation may be assessed using machine learning models trained to identify aspects of the presentation that may be improved or aspects of the presentation for which the presenter performed well. The presentation content, such as slides or documents, may also be analyzed by the presentation coach unit 340 using one or more machine learning models to provide feedback on these materials that may be used to improve the presentation. The presentation coach unit 340 may also be used to rehearse a presentation and to obtain constructive feedback that may be used to improve the presentation skills of the presenter and/or the presentation content prior to providing the presentation to a live audience.

In some implementations, the presentation platform 110 enables a human moderator or presenter to provide feedback to the virtual presenter. This feedback may be provided after a rehearsal of the presentation or after the presentation has been made to an audience. In some implementations, the human user or moderator is able to provide feedback to the user during a presentation to adjust one or more operating parameters of the virtual presenter. In some implementations, the human moderator or presenter provides feedback through the chat interface shown in FIGS. 4D-4F. In other implementations, the presentation platform 110 presents or causes the user device 205 of the human moderator or presenter to present a feedback interface that enables the user to provide feedback to the virtual presenter. The feedback user interface operates similarly to the chat user interface shown in the preceding examples for receiving and answering questions from the audience members. The human moderator or presenter provides a natural language feedback to the virtual presenter in this chat user interface. In a non-limiting example, the human moderator or presenter provides feedback to virtual presenter to provide more or less detail per slide, to spend more or less time discussed each slide, to spend more or less time answering questions, to use a more simple or more difficult vocabulary in the presentation, and/or make other such changes to the operating parameters of the model. The human moderator or presenter may also provide positive feedback regarding aspects of the presentation style of the virtual presenter to reinforce this behavior.

The web application 370 can be accessed by the browser application 355 or browser-enabled instance of the native application 350 of the client devices 205a-105d. The web application 370 provides a user interface for creating, modifying, and/or presenting presentation content. The web application 370 provides a user interface similar to that shown in FIGS. 4A-4H in some implementations.

The search service 230 includes a search engine 385 that is configured to receive queries for content from the presentation platform 110 and/or the client device 205. The search results may include web pages, imagery, videos, documents, and/or other types of electronic content. The search results may be ranked by relevance based on search terms included in the query provided to the search service 230. The search service 230 provides the search results to the presentation platform 110 or the client device 205 from which the search query originated 230. The content search unit 116 of the presentation platform 110 can send search queries for Internet-based content sources to the search service 230 to obtain answers to questions from audience members.

The content provider 225 includes a web application 390 and a content datastore 395. In some implementations, the content provider 225 provides a web application 390 that provides textual content and/or imagery that may be used to create the presentation slides 106 by the presentation platform 110. The web application 390 provides textual content and/or imagery that may be analyzed to generate responses to questions presented by members of the audience during the presentation. The content datastore 395 is a persistent datastore that stores the imagery and/or textual content maintained by the content provider 225. The search service 230 is configured to search for content in the content datastore 395 and/or provided by the web application 390.

The client device 205 includes a native application 350 and/or a browser application 355, in some implementations. The native application 350 is configured to communicate with the presentation platform 110 and the search service 230 and/or the content provider 225. The native application 350 can send requests to the presentation platform 110 to create new presentation content and/or to modify existing presentation content. The native application 350 can also send requests to the presentation platform 110 to present the presentation using the virtual presenter.

The browser application 355 is an application for accessing and viewing web-based content, which may be provided by web application 370 of the presentation platform 110. The web application 370 enables the user to utilize the services of the presentation platform 110 in a similar manner as the native application described above. In some implementations, the presentation platform 110 supports both the native application 350 and the web application 370, and the users may choose which approach best suits their needs.

The virtual presenter support unit 380 enables the virtual presenter techniques herein to be utilized with a presentation platform, communication platform, or collaboration platform without having to be directly integrated with the software of the presentation platform, communication platform, or collaboration platform. In such implementations, the virtual presenter support unit 380 implements a virtual webcam driver and a virtual microphone driver. The video content generated by the video synthesizer unit 132 is provided to the virtual webcam driver and the synthesized speech generated by the text-to-speech model 130 is provided to the microphone driver. A technical benefit of this approach is that the virtual presenter can be implemented on a presentation platform, communication platform, or collaboration platform without having to update the software of the platform. In such implementations, the user interfaces for viewing and configuring the behavior of the virtual presenter are provided as separate user interfaces that can be accessed on the client device 205 of the presenter.

Figure 4A:
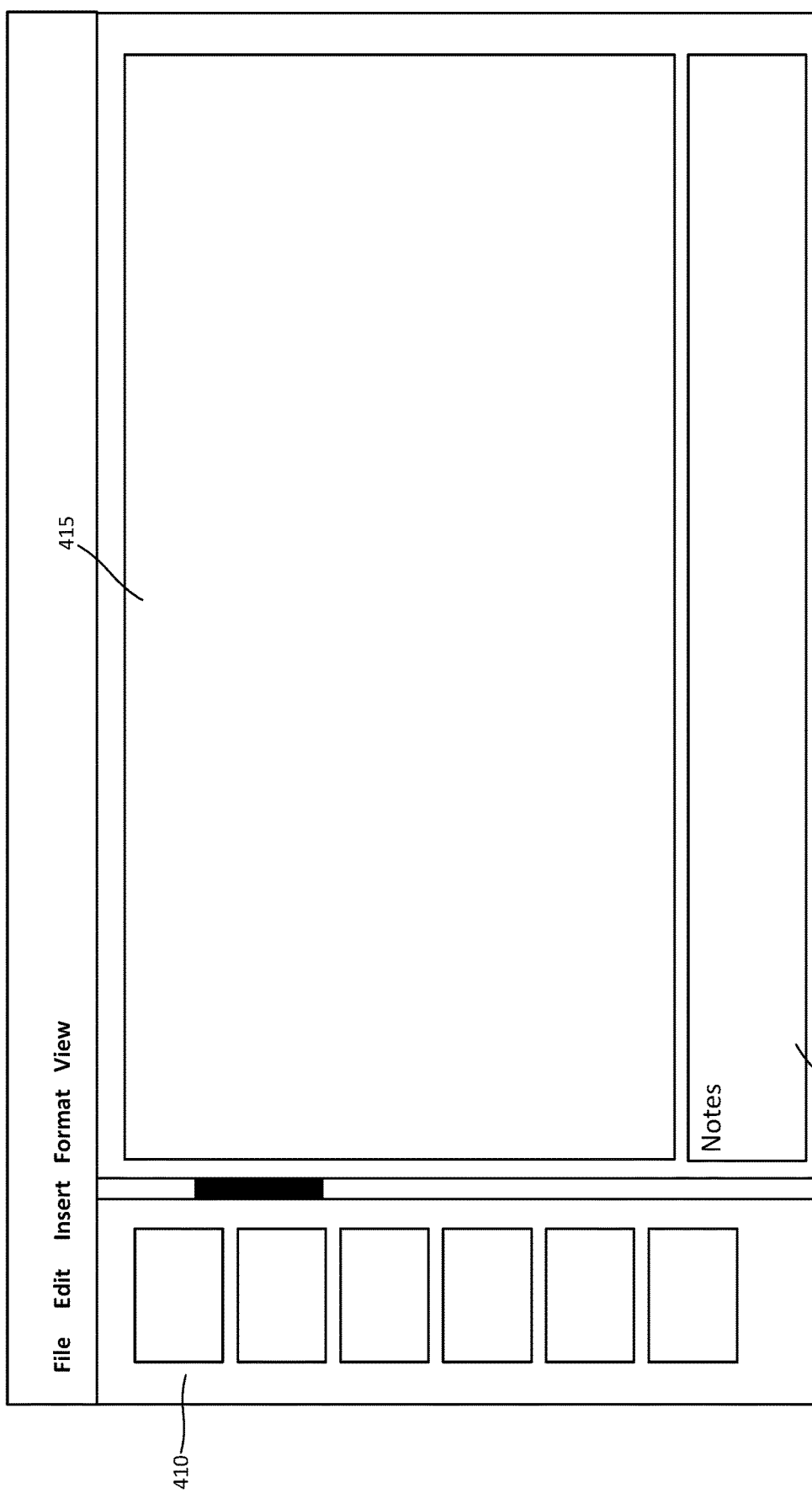

FIGS. 4A-4H are diagrams of an example user interfaces showing various aspects of the functionality for automatically presenting presentation content using a virtual presenter provided herein. FIG. 4A shows an example of the user interface 405, which includes a content pane 415 that is used to display a currently selected slide or a first slide in a deck of slides of a presentation if no slide has been selected. The user may edit the slide being shown in the content pane 415. The slides pane 410 provides a representation of the slides included in the slide deck. The user can click on or otherwise activate one of these representations to cause the slide associated with that representation to be shown in the content pane 415. The notes pane 420 is used to display notes and/or transcript information associated with each slide. The notes information may be used by the presenter of a presentation to recall what they plan to say while presenting the presentation slides 106. The notes information is typically hidden when presenting the presentation locally or streaming the presentation to a remote audience. The notes information may be used to present the presentation transcript 102 and/or the augmented transcript.

Figure 4B:
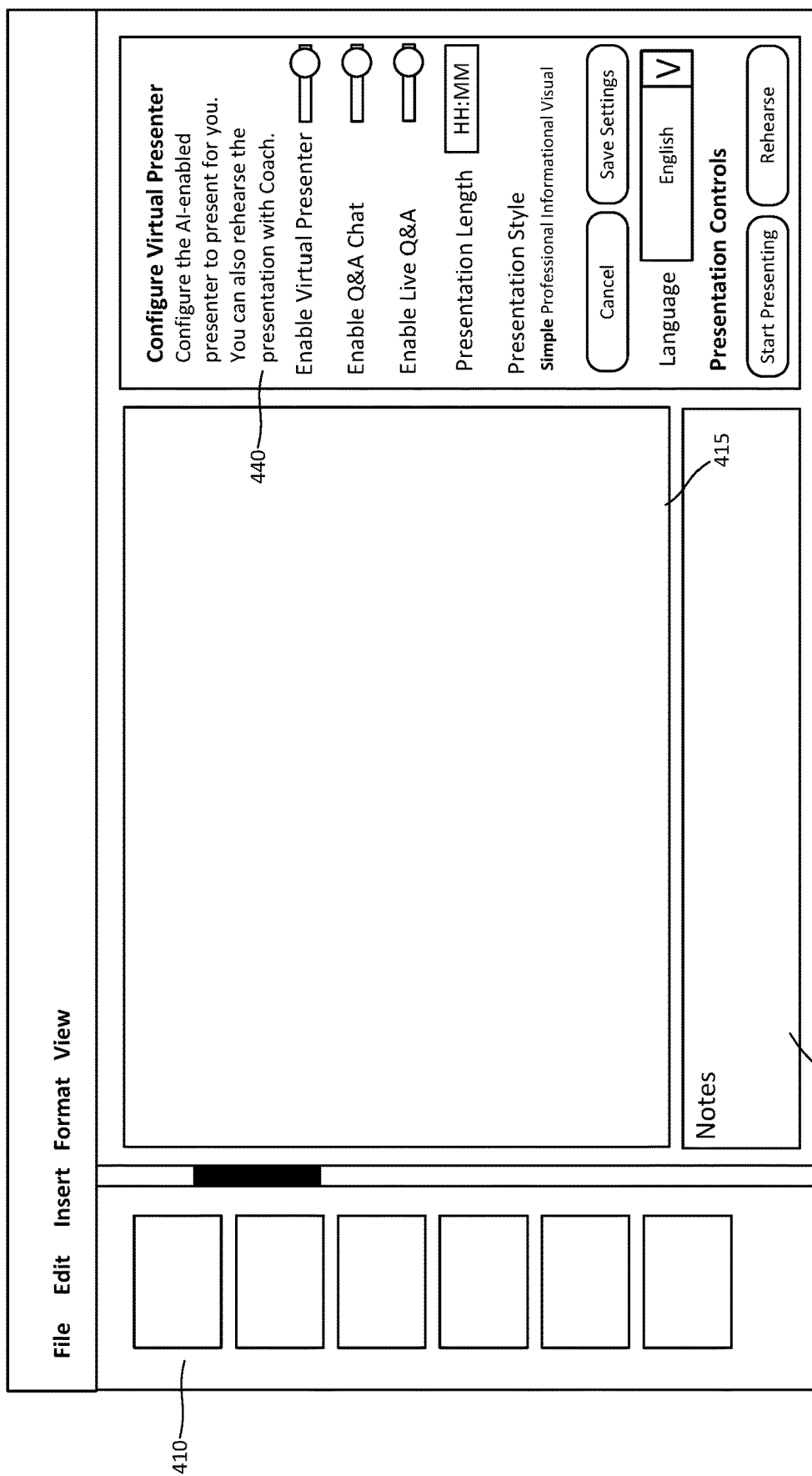

FIG. 4B shows an example of a virtual presenter control panel 440 that provides controls for enabling or disabling the virtual presenter, and for configuring various operational parameters of the virtual assistant. The user interface 405 would be presented on the computing device 205 of the user who wishes to present the presentation to an audience of other users. The user may save the settings to a presentation datastore maintained by the presentation platform 110. The virtual presenter control panel 440 includes a control for enabling or disabling the virtual presenter, and for enabling or disabling the real-time question and answer chat during a presentation by the virtual presenter, and for enabling or disabling responses by the virtual presenter during the presentation. Examples of the Q&A chat are shown in FIGS. 4D-4F. As discussed in the preceding examples, the presentation platform supports receiving questions from the computing devices 205 of audience members as text in the chat window or as an audio clip. The presentation platform 110 converts the audio content to text for those questions received as audio content and refines the question text using the LLM 120 before searching for answers to the question. Enabling the Q&A chat option causes the chat option to be presented to the audience members and the presentation platform 110 to generate AI-driven responses to questions received via the chat window. The response to the question will be in textual form in the chat window. However, if the "enable live Q&A" option is also activated, the presentation platform 110 pauses the presentation of the presentation content by the virtual presenter in response to a question and causes the virtual presenter to present the questions and answers to the users. A technical benefit of this approach is that the audience members can engage with the virtual presenter as they would with a human presenter and pose questions that are answered by the virtual presenter during the presentation.

The virtual presenter control panel 440 includes a presentation style selector, a language selector, and a presentation length field shown in FIG. 4B. The language in which the virtual presenter presents the presentation content does not need to be the same language as the slides or the documents used to generate the presentation content. A technical benefit of this approach is that a presenter can generate a set of slides in a language with which the user is familiar, but the virtual presenter can present the slides in a different language with which the audience is more familiar. The presentation length can be set so that the virtual presenter does not exceed an allocated time for the presentation. The Q&A unit 112 of the presentation platform 110 uses the presentation length set by the user and the elapsed time since the presentation commenced to determine whether there is time for the virtual user to pause the presentation to address questions. In some implementations, if the Q&A unit 112 determines that there is insufficient time for the virtual presenter to address the questions during the presentation, the answers to the question are provided in the chat. The presentation style enables the user to select a presentation style to be utilized by a virtual presenter when presenting the presentation content to an audience of the presentation. Each of the presentation styles may be associated with a short description of the style that is included in the prompt to the LLM 120.

Figure 4C:
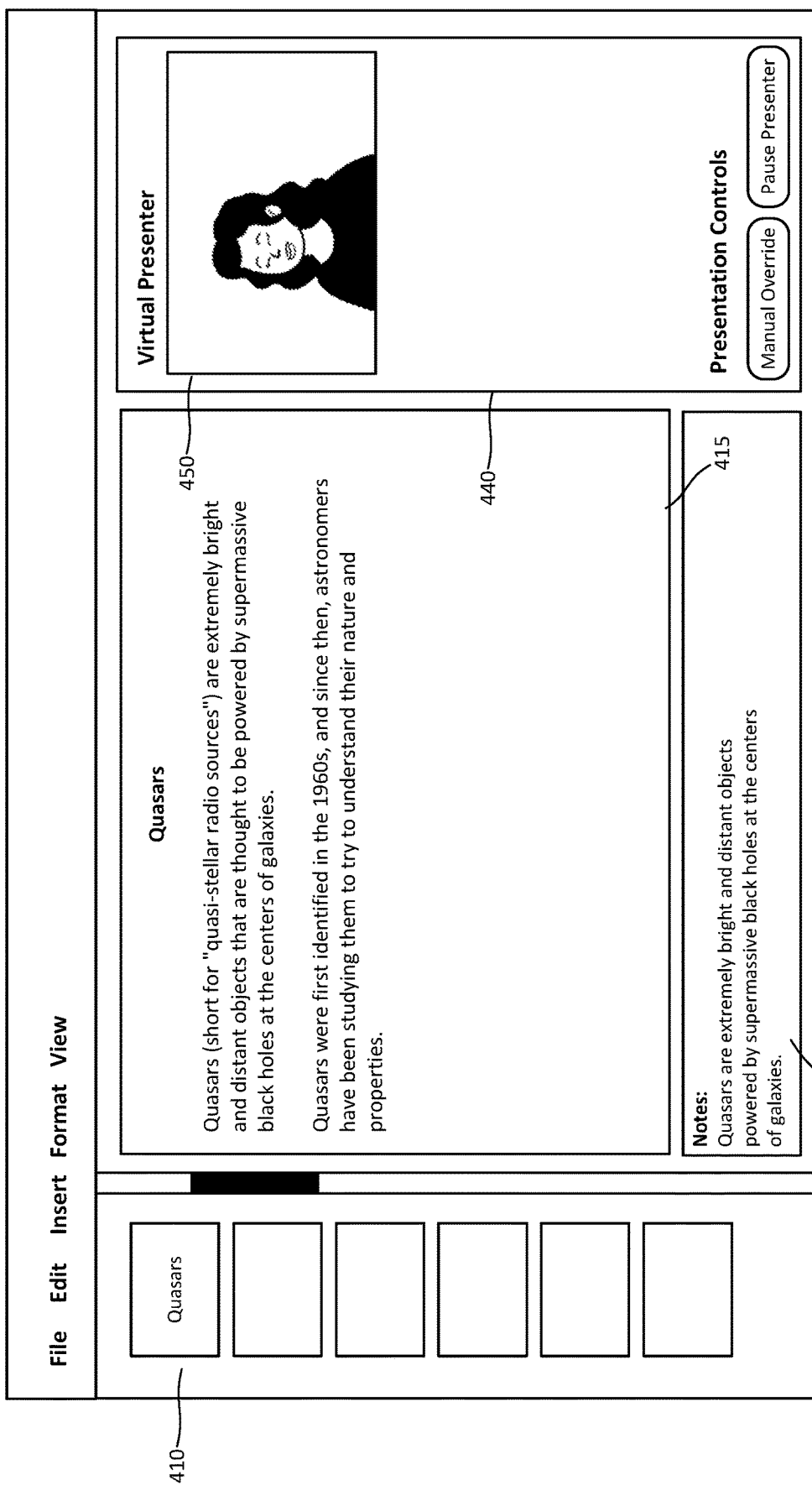
Figure 4D:
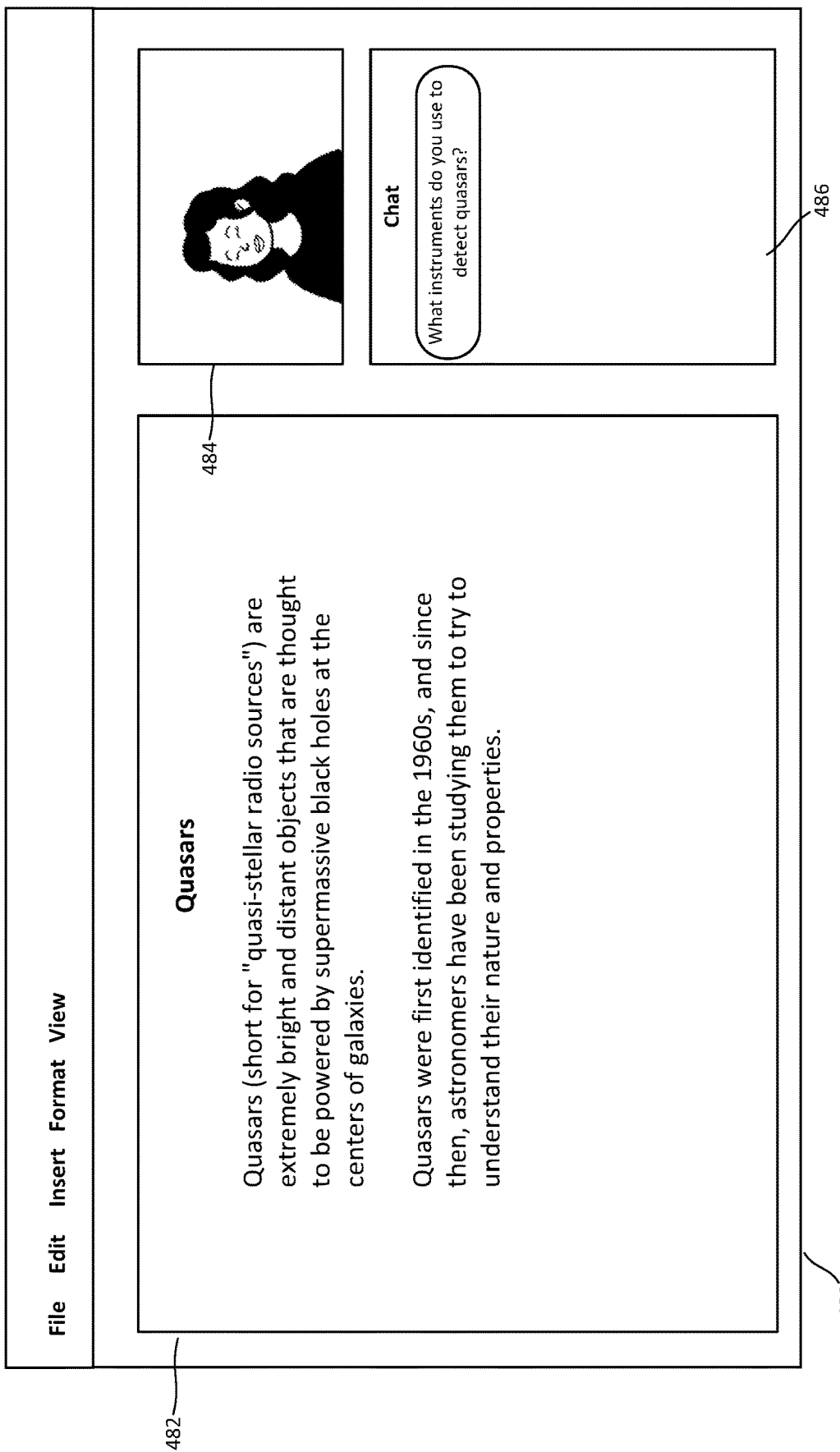
Figure 4E:
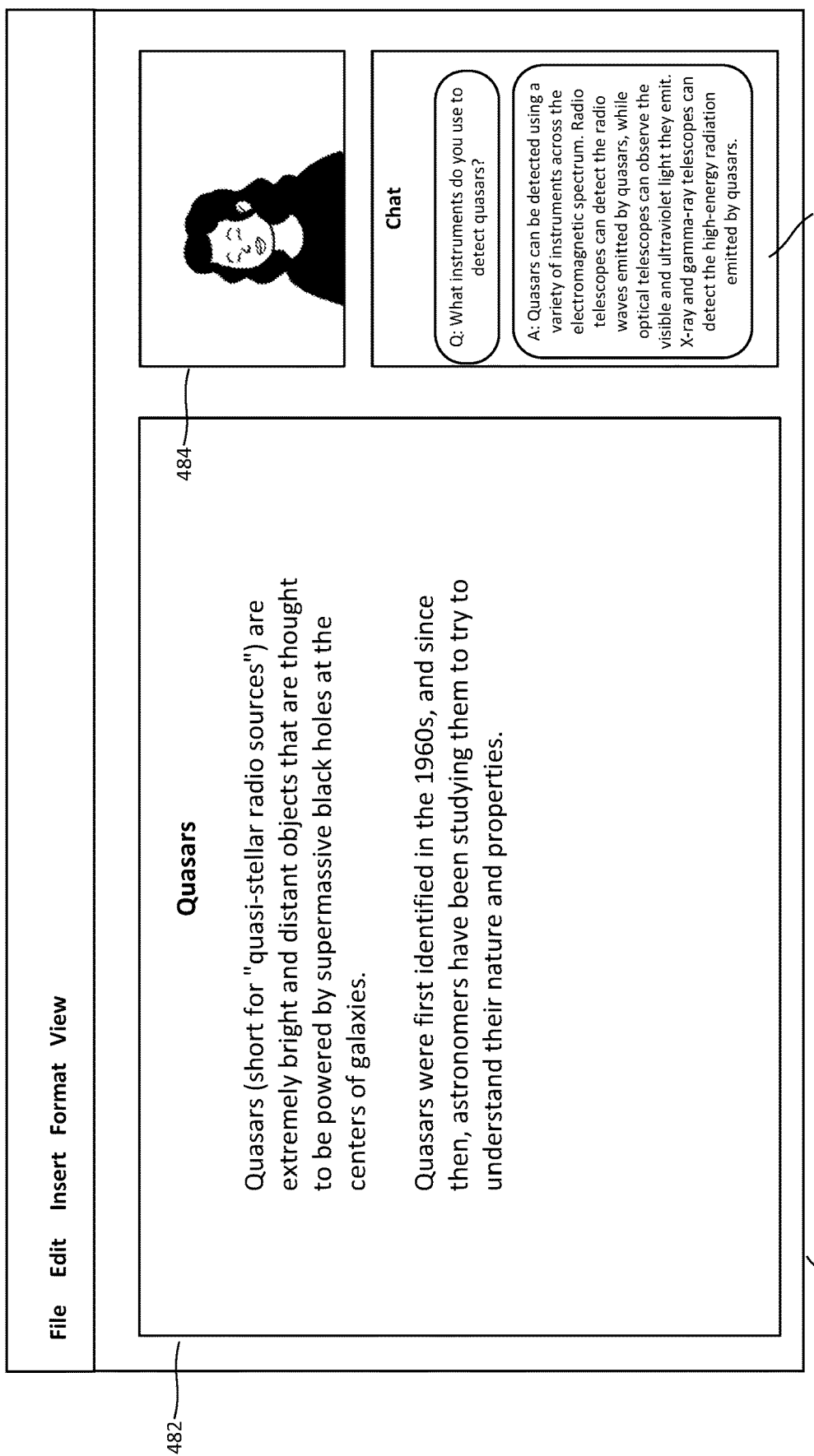
Figure 4F:
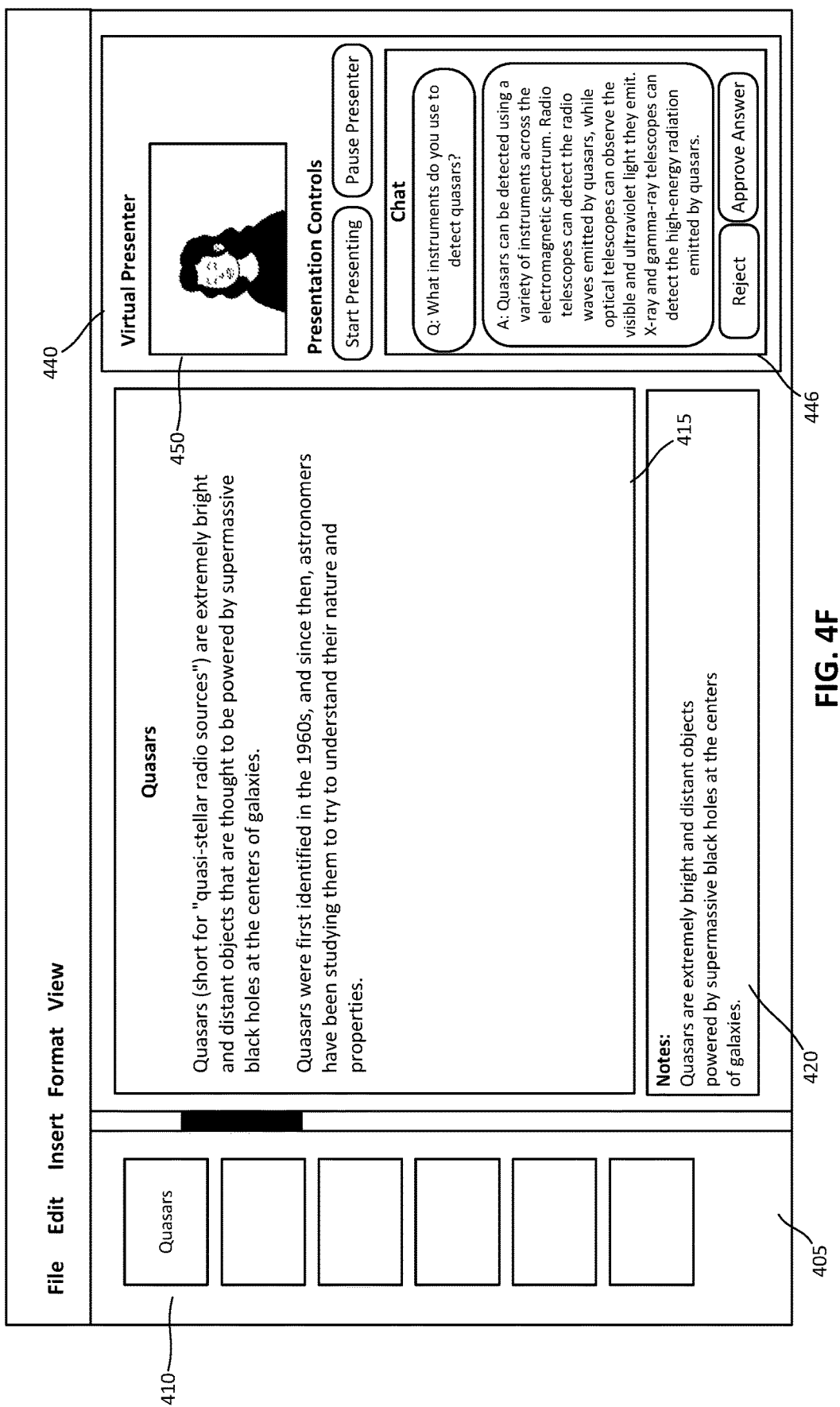

FIG. 4C shows an example of the user interface 405 shown in FIG. 4B after the user has started presenting using the virtual presenter. The virtual presenter pane 450 is shown in the virtual presenter configuration panel 440, which display the video content of the virtual presenter being generated by the animation unit 128 and being streamed to the computing device 205 of the members of the audience by the content streaming unit 335 of the presentation platform 110. The virtual presenter configuration panel 440 has been updated to include a manual override control and a pause presenter control. The user can activate the pause presenter control if the presenter would like to temporarily halt the presentation to address questions, to address a technical problem, or for other reasons. The users can then resume the presentation by the virtual presenter.

The manual override option provides the user with a means for halting the presentation by the virtual presenter and taking manual control by the user. The manual override control provides a failsafe should problems occur with the presentation that would require the user to take over the remainder of the presentation. The manual override control also activates a microphone and/or camera associated with the computing device 205 of the presenter to enable the presenter to assume control of the presentation and to step in for the virtual presenter and continue the presentation. In response to receiving the indication that the human moderator will be taking over the presentation, the presentation platform 110 halts streaming of the audiovisual presentation content including the audio content and the animation content of the virtual presenter to the plurality of computing devices of the audience of the presentation. The presentation platform 110 and/or the client device 205 of the human moderator or presenter then generates new audio and video streams that include the human moderator or presenter. The presentation platform 110 then streams the audiovisual presentation content including the human moderator or presenter to the computing devices 205 of the audience of the presentation.

In some implementations, when a presentation utilizing the virtual presenter is initiated, the presentation platform 110 utilizes the following presentation format. The virtual presenter initially introduces itself and provides a brief overview of the presentation topic. The brief overview is obtained from the LLM 120. The virtual presenter explains the format of the presentation, including instructions on how the audience members can ask questions and how those questions will be answered. After the introduction, the slides are presented with the synthesized speech generated by the animation unit 128 of the presentation platform 110. If the user has activated the synchronous Q&A (also referred to herein as "Live Q&A"), the presentation platform 110 takes a break from the presentation every N slides, where N is an integer value that can be specified by the user setting up the presentation session. The presentation platform 110 decides which questions should be prioritized for answering that were posed by audience members in the last N slides. Questions will only be answered if the overall presentation has not exceeded a time limit specified for the presentation. Answer delivery falls back to responses in the chat if there is insufficient time remaining for the virtual presenter to present the questions and answers. At the end of the presentation, a conclusion is presented by the virtual presenter. The conclusion is a short summary of the presentation generated by LLM 120. The Q&A unit 112 also conducts a final Q&A session prior to presenting the conclusion if time permits.

FIG. 4D shows an example of the user interface 480 which is presented on the computing device of audience members of the presentation. The content pane 482 shows the current slide of the presentation. The virtual presenter pane 484 shows the virtual presenter, and the chat pane 486 shows the chat for the presentation. In the example shown in FIG. 4D, an audience member has entered a question related to the presentation. The contents of the chat window are available to all of the audience member and to the user who is presenting. In the example shown in FIG. 4E, the chat pane 486 has been updated with an answer generated by the Q&A unit 112 of the presentation platform 110. The virtual assistant may also pause the presentation and address the question depending upon whether the live Q&A function has been enabled and whether there is sufficient time for the virtual presenter to temporarily pause the presentation to address the question and still have time to complete the presentation in the allocated time limits.

FIG. 4F shows an example of the user interface 405 of the user who is presenting using the virtual presenter in which the chat pane 446 is presented in the virtual presenter configuration panel 440. FIG. 4F shows an example of an approve answer control that is presented to the user who is presenting to provide the user with an option to review the answer automatically generated by the LLM before the answer is presented to the audience. If the user activates the approve answer control, the answer is published to the chat and is visible to members of the audience on their respective computing devices 205. The user clicks on or otherwise activates the reject answer control to discard the answer and prevent the answer from being published to the chat and visible to the members of the audience. A technical benefit of this approach is that it provides another safeguard in which a human user can review the answer produced by the LLM to ensure that the answer is not off-point or includes potentially offensive content. In some implementations, the user interface 405 sends an indication to the Q&A unit 112 of the presentation platform 110 to cause the Q&A unit 112 to revise the answer. The revised answer is once again presented to the user in the chat pane 446 to provide the user with an opportunity to review the revised answer and to reject or accept the answer. In some implementations, similar controls are provided that enable the user to approve or reject the questions presented from the audience. The user must approve or reject the question received from the computing device 205 of an audience member before the question is presented in the chat pane 486 of the other members of the audience.

Figure 4G:
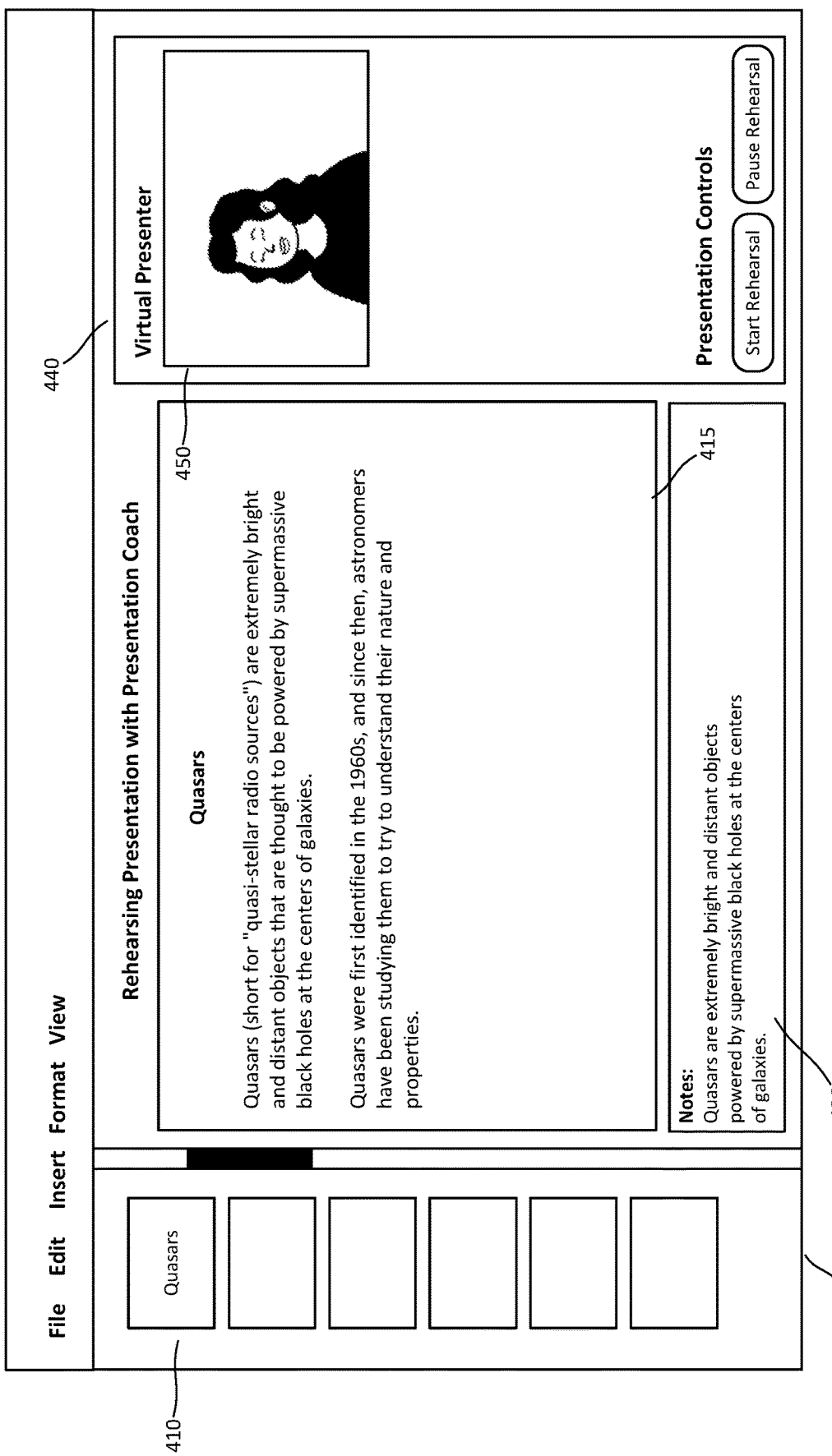
Figure 4H:
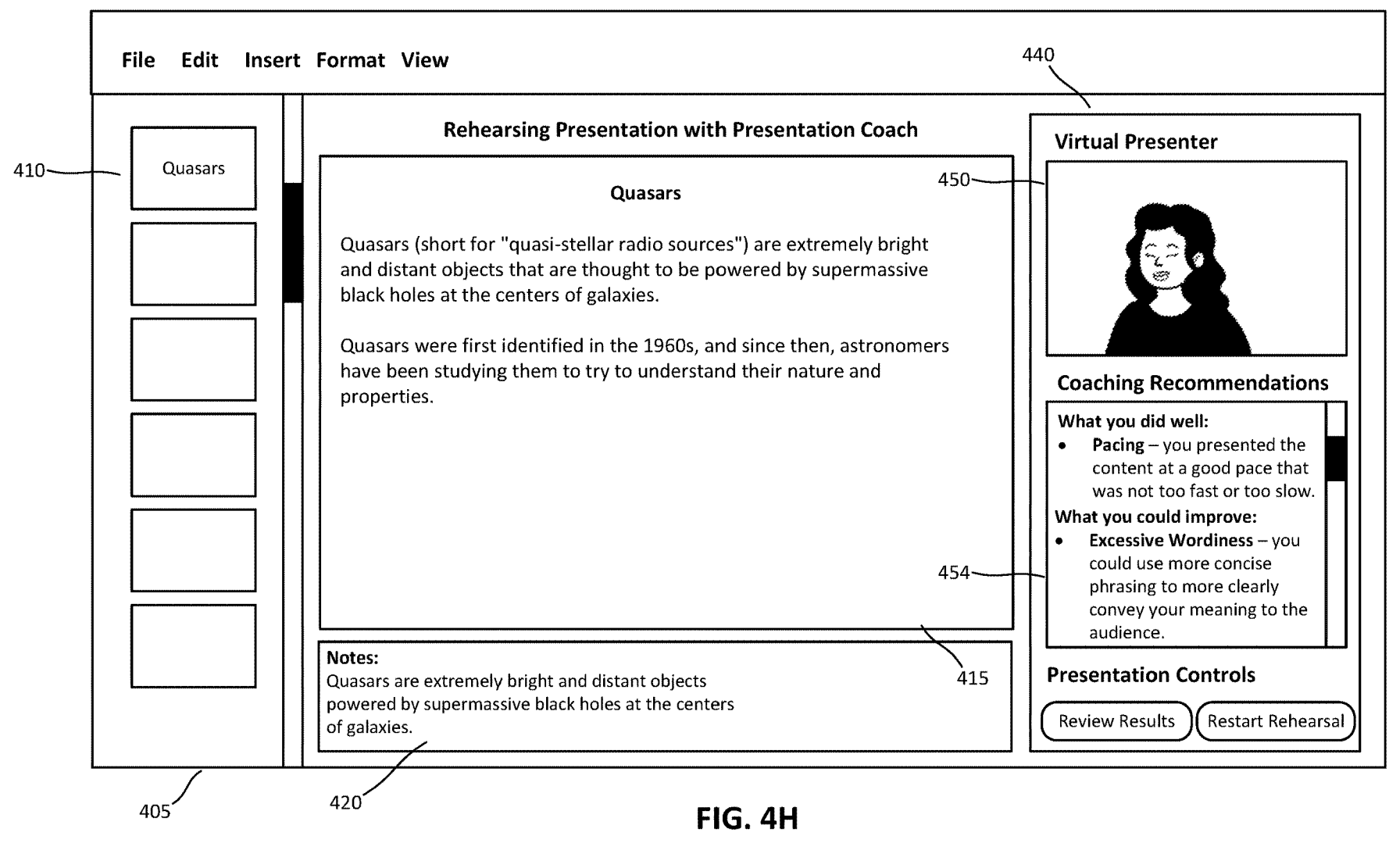

FIG. 4G shows an example of the user interface 405 in which the user has activated the rehearsal mode. In the example shown in FIG. 4G, the user has activated the rehearsal mode with the presentation coach implemented by the presentation coach unit 340 of the presentation platform 110. The virtual presenter presents the presentation as if it were a live presentation being presented to an audience, except the audiovisual content associated with the virtual presenter is provided to the one or more machine learning models utilized by the presentation coach unit 340 to analyze audio and/or video content of the presentation to identify aspects of the presentation that may be improved and to highlight aspects of the presentation which the virtual presenter performed well. FIG. 4H shows an example of the feedback 454 provided in response to the rehearsal with the presentation coach. The feedback identifies aspects of the presentation that went well as well as aspects of presentation that could be improved upon.

Figure 5:
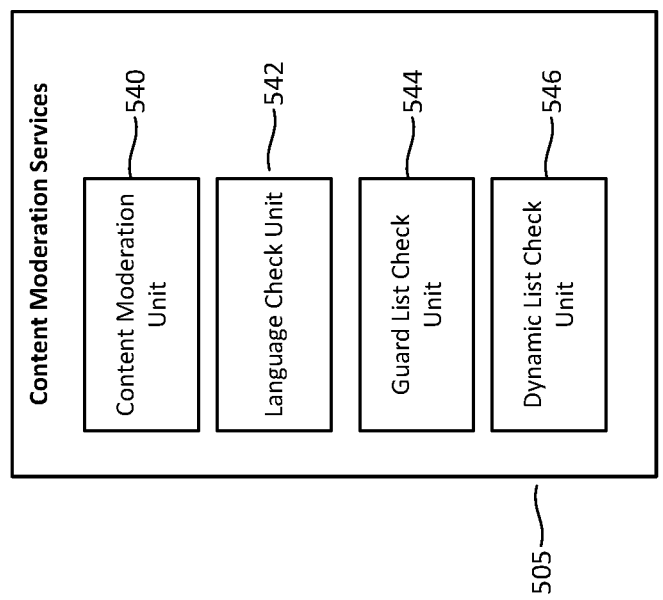
FIG. 5 is a content moderation service that can be used by the presentation platform shown in the preceding figures.

FIG. 5 is a flow diagram showing an example implementation of content moderation services 505 that may be used ensure that the presentation slides 106, the presentation transcript 102, the question content 104, as well as any content generated by the LLM 120 and/or other generative models utilized by the presentation platform 110 does not include any prohibited offensive or potentially offensive content. The content moderation services 505 performs several types of checks on the inputs to the LLM 120 and the output from the LLM 120. The content moderation unit 540 is implemented by a machine learning model trained to analyze the textual inputs to perform a semantic analysis on the content to predict whether the inputs include potentially offensive language. The language check unit 542 performs another check on the textual inputs using a second model configured to analyze the words and/or phrase used in textual content to identify potentially offensive language. The guard list check unit 544 is configured to compare the language used in the inputs with a list of prohibited terms including known offensive words and/or phrases. The dynamic list check unit 546 provides a dynamic list that can be quickly updated by administrators to add additional prohibited words and/or phrases. The dynamic list may be updated to address problems such as words or phrases becoming offensive that were not previously deemed to be offensive. The words and/or phrases added to the dynamic list may be periodically migrated to the guard list as the guard list is updated. The specific checks performed by the content moderation services 505 may vary from implementation to implementation. If one or more of these checks determines that the presentation slides 106, the presentation transcript 102, the question content 104, as well as any content generated by the LLM 120 and/or other generative models utilized by the presentation platform 110 include offensive content, the content moderation services 505 can notify the presentation platform 110 that some action should be taken. The presentation platform 110 can analyze the presentation slides 106 and the presentation transcript 102 using the content moderation services 505 at the time that the user sets up the presentation to determine whether the presentation slides 106 or the presentation transcript 102 includes any prohibited offensive or potentially offensive content and prevent the virtual avatar from presenting the presentation if prohibited offensive or potentially offensive content is detected. The presentation platform 110 also analyzes the question content 104 received from the computing devices 205 of the users in the audience of the presentation. Questions received as audio content are converted to textual format before being analyzed by the content moderation services 505. The presentation platform 110 rejects questions containing prohibited offensive or potentially offensive content and can cause the computing devices of the users in the audience to display an indication that the question was blocked by the moderation services. The presentation platform 110 can also reject questions for which the refined question text and/or the answer text include prohibited offensive or potentially offensive content. A technical benefit of this approach is that the content moderation services 505 provides safeguards against both user-created and model-created content to ensure that prohibited offensive or potentially offensive content is not included in the presentation.

Figure 6A:
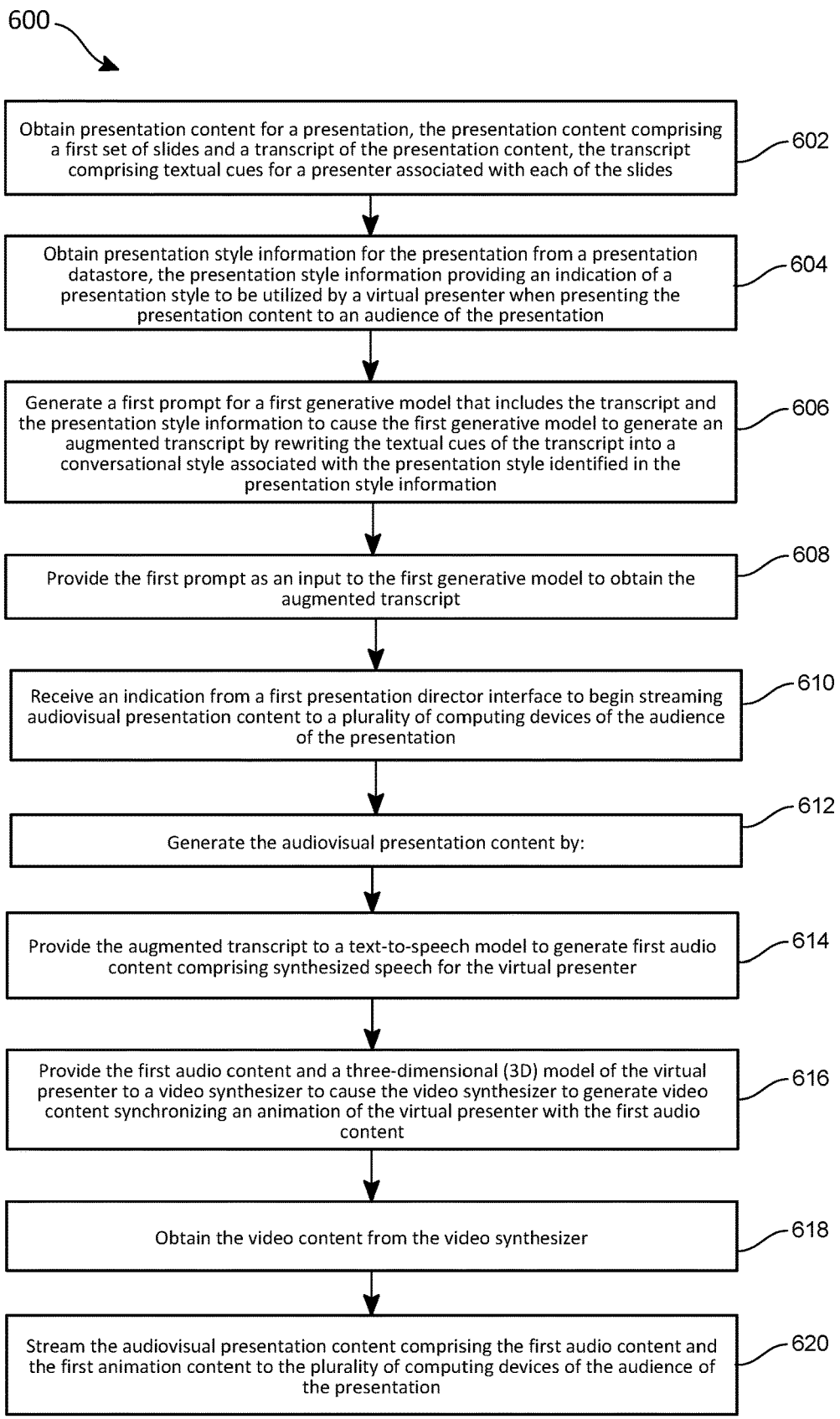
FIG. 6A is a flow chart of an example process for providing an AI-driven presenter of a presentation according to the techniques provided herein.

FIG. 6A is an example flow chart of an example process 600 for automatically presenting presentation content with a virtual presenter. The process 600 may be implemented by the presentation platform 110 and/or the client device 205 using the techniques described in the preceding examples.

The process 600 includes an operation 602 of obtaining presentation content for a presentation. The presentation content includes a first set of slides and a transcript of the presentation content. The transcript comprising textual cues for a presenter associated with each of the slides. In some implementations, the presentation platform automatically generates the slide content and the transcript from a set of source documents provided by the user. In other implementations, a user authors the slides and/or collaborates with an LLM to generate the slide content, and the transcript is automatically generated from the slide content using the LLM.

The process 600 includes an operation 604 of obtaining presentation style information for the presentation from a presentation datastore. The presentation style information providing an indication of a presentation style to be utilized by a virtual presenter when presenting the presentation content to an audience of the presentation. As shown in the example user interface shown in FIG. 4B, the user may select a presentation style for the presentation and well as configure other parameters associated with the virtual presenter. The presentation platform 110 stores this information in the presentation datastore, which is maintained in a persistent memory of the presentation platform 110.

The process 600 includes an operation 606 of generating a first prompt for a first LLM that includes the transcript and the presentation style information to cause the first LLM to generate an augmented transcript by rewriting the textual cues of the transcript into a conversational style associated with the presentation style identified in the presentation style information, and an operation 608 of providing the first prompt as an input to the first LLM to obtain the augmented transcript. The transcript augmentation unit 125 formulates the first prompt and submits the presentation transcript 102 to the LLM 120 to obtain the augmented transcript. As discussed in the preceding examples, the first LLM may be implemented using a GPT model.

The process 600 includes an operation 610 of receiving an indication from a first presentation director interface to begin streaming audiovisual presentation content to a plurality of computing devices of the audience of the presentation. The user controlling the presentation by the virtual presenter may click on or otherwise activate the virtual presenter. An example of such a user interface is shown in FIGS. 4B and 4G, the user may click on or otherwise activate the "start presenting" control.

The process 600 includes an operation 612 of generating the audiovisual presentation content. The operation 612 includes an operation 614 of providing the augmented transcript to a text-to-speech model to generate first audio content comprising synthesized speech for the virtual presenter, an operation 616 of providing the first audio content and a three-dimensional (3D) model of the virtual presenter to a video synthesizer to cause the video synthesizer to generate video content synchronizing an animation of the virtual presenter with the first audio content, and an operation 618 of obtaining the video content from the video synthesizer. The presentation management unit 126 provides the augmented transcript to the animation unit 128 to generate the audiovisual content of the virtual presenter during the presentation. The text-to-speech model 130 generates the synthesized speech for the virtual presenter, and the video synthesizer unit animates the 3D model of the virtual presenter according to this synthesized speech. The video synthesizer unit 132 also takes into account emotion indicators in the augmented transcript in some implementations.

The process 600 includes an operation 620 of streaming the audiovisual presentation content comprising the first audio content and the first animation content to the plurality of computing devices of the audience of the presentation. The content streaming unit 335 of the presentation platform 110 transmits the presentation audiovisual content 190 to the client devices 205 of the audience of the presentation.

Figure 6B:
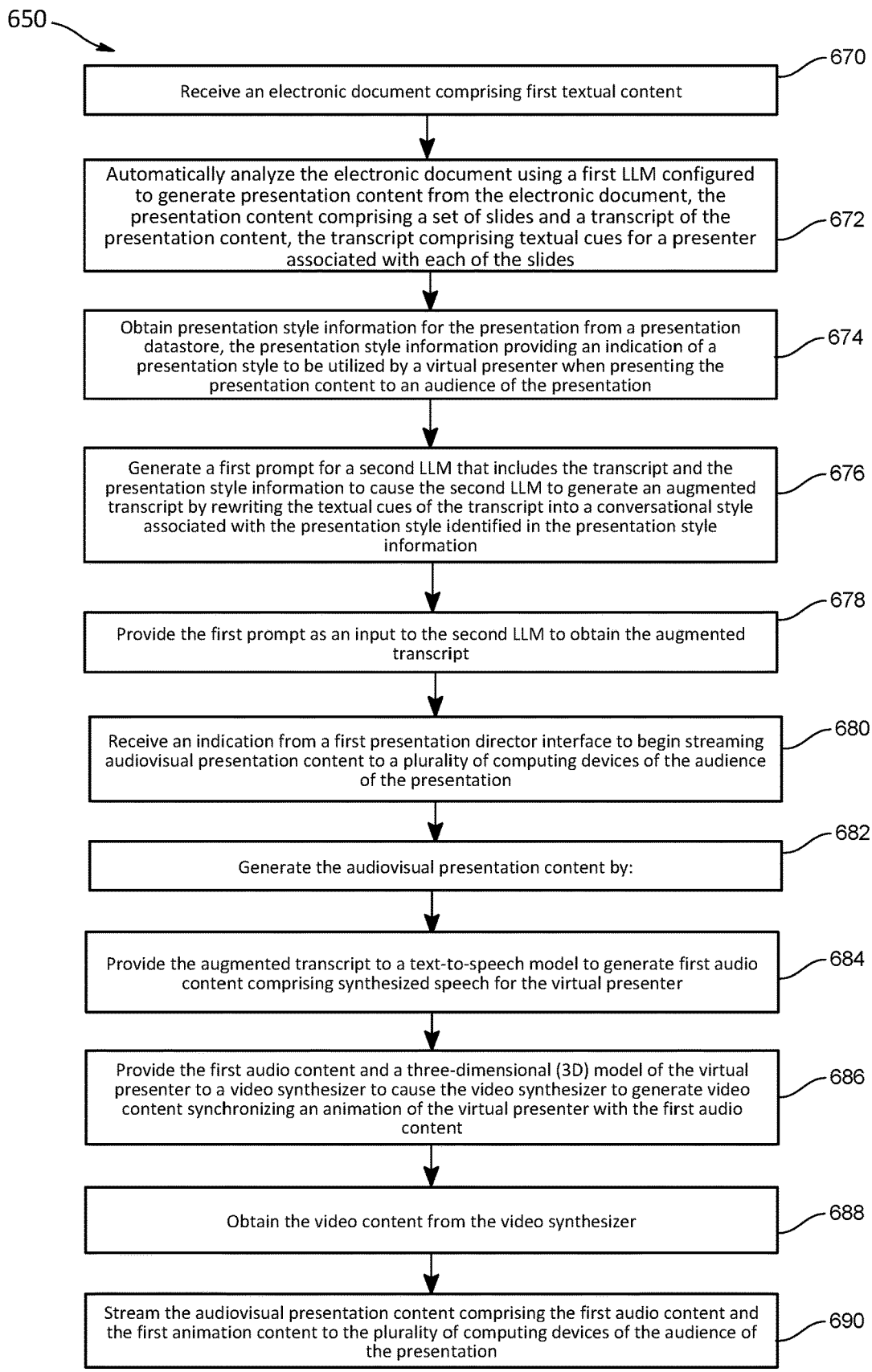
FIG. 6B is a flow chart of another example process for providing an AI-driven presenter of a presentation according to the techniques provided herein.

FIG. 6B is a flow chart of another example process 650 for automatically presenting presentation content with a virtual presenter. The process 650 may be implemented by the presentation platform 110 and/or the client device 205 using the techniques described in the preceding examples.

The process 650 includes an operation 670 of receiving an electronic document comprising first textual content and an operation 672 of automatically analyzing the electronic document using a first LLM configured to generate presentation content from the electronic document. The presentation content comprising a set of slides and a transcript of the presentation content, and the transcript comprising textual cues for a presenter associated with each of the slides. As discussed in the preceding examples, the presentation platform 110 analyzes one or more source documents using an LLM to automatically generate the presentation content, including the presentation slides 106 and the presentation transcript 102.

The process 650 includes an operation 674 of obtaining presentation content for a presentation. The presentation content includes a first set of slides and a transcript of the presentation content. The transcript comprising textual cues for a presenter associated with each of the slides. In some implementations, the presentation platform automatically generates the slide content and the transcript from a set of source documents provided by the user. In other implementations, a user authors the slides and/or collaborates with an LLM to generate the slide content, and the transcript is automatically generated from the slide content using the LLM.

The process 650 includes an operation 676 of obtaining presentation style information for the presentation from a presentation datastore. The presentation style information providing an indication of a presentation style to be utilized by a virtual presenter when presenting the presentation content to an audience of the presentation. As shown in the example user interface show in FIG. 4B, the user may select a presentation style for the presentation and well as configure other parameters associated with the virtual presenter. The presentation platform 110 stores this information in the presentation datastore, which is maintained in a persistent memory of the presentation platform 110.

The process 650 includes an operation 676 of generating a first prompt for a second LLM that includes the transcript and the presentation style information to cause the second LLM to generate an augmented transcript by rewriting the textual cues of the transcript into a conversational style associated with the presentation style identified in the presentation style information, and an operation 678 of providing the first prompt as an input to the second LLM to obtain the augmented transcript. The transcript augmentation unit 125 formulates the first prompt and submits the presentation transcript 102 to the LLM 120 to obtain the augmented transcript.

The process 650 includes an operation 680 of receiving an indication from a first presentation director interface to begin streaming audiovisual presentation content to a plurality of computing devices of the audience of the presentation. The user controlling the presentation by the virtual presenter may click on or otherwise activate the virtual presenter. An example of such a user interface is shown in FIGS. 4B and 4G, the user may click on or otherwise activate the "start presenting" control.

The process 650 includes an operation 682 of generating the audiovisual presentation content. The operation 682 includes an operation 684 of providing the augmented transcript to a text-to-speech model to generate first audio content comprising synthesized speech for the virtual presenter, an operation 686 of providing the first audio content and a three-dimensional (3D) model of the virtual presenter to a video synthesizer to cause the video synthesizer to generate video content synchronizing an animation of the virtual presenter with the first audio content, and an operation 688 of obtaining the video content from the video synthesizer. The presentation management unit 126 provides the augmented transcript to the animation unit 128 to generate the audiovisual content of the virtual presenter during the presentation. The text-to-speech model 130 generates the synthesized speech for the virtual presenter, and the video synthesizer unit animates the 3D model of the virtual presenter according to this synthesized speech. The video synthesizer unit 132 also takes into account emotion indicators in the augmented transcript in some implementations.

The process 650 includes an operation 690 of streaming the audiovisual presentation content comprising the first audio content and the first animation content to the plurality of computing devices 205 of the audience of the presentation. The content streaming unit 335 of the presentation platform 110 transmits the presentation audiovisual content 190 to the client devices 205 of the audience of the presentation.

The detailed examples of systems, devices, and techniques described in connection with FIGS. 1-6B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
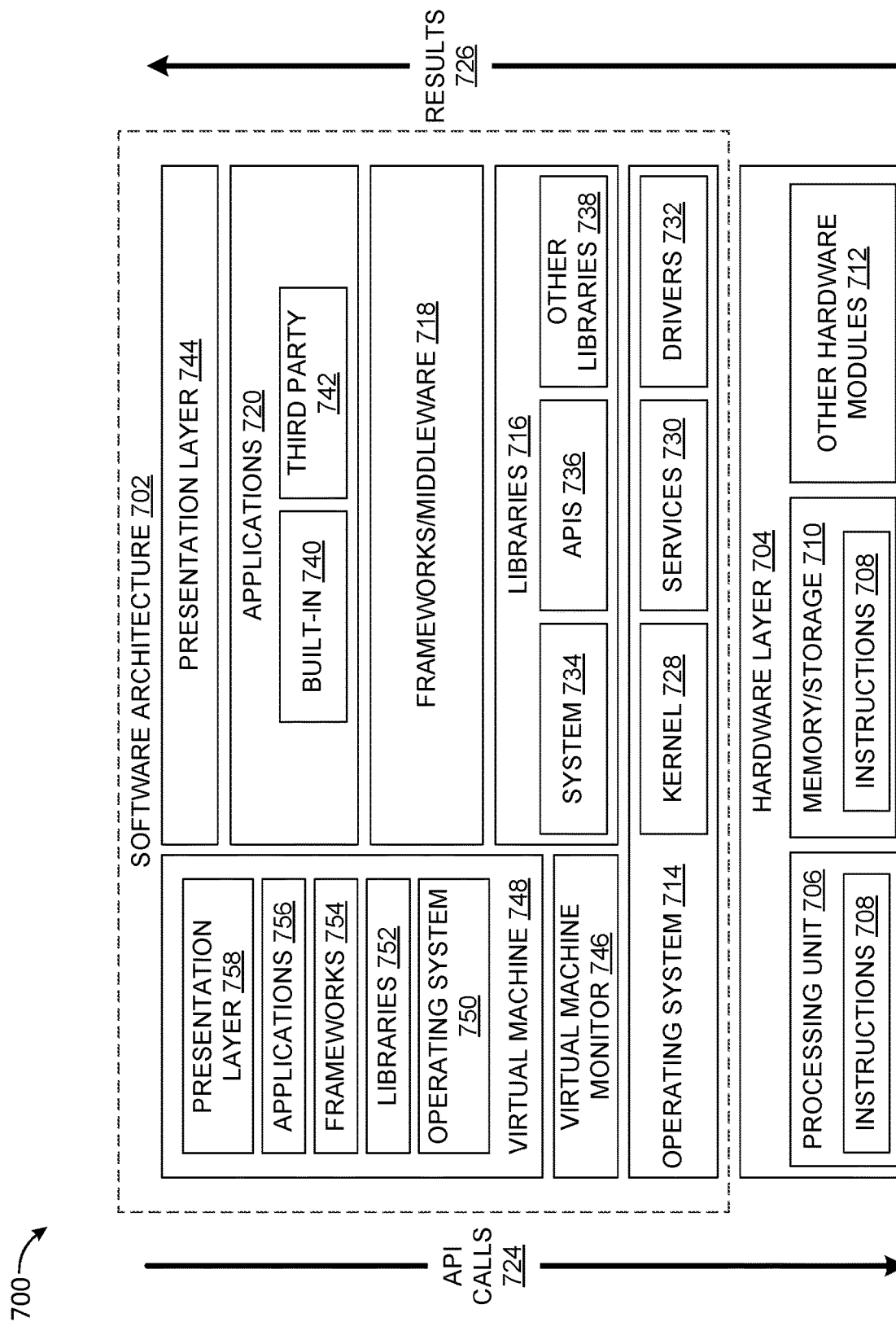
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
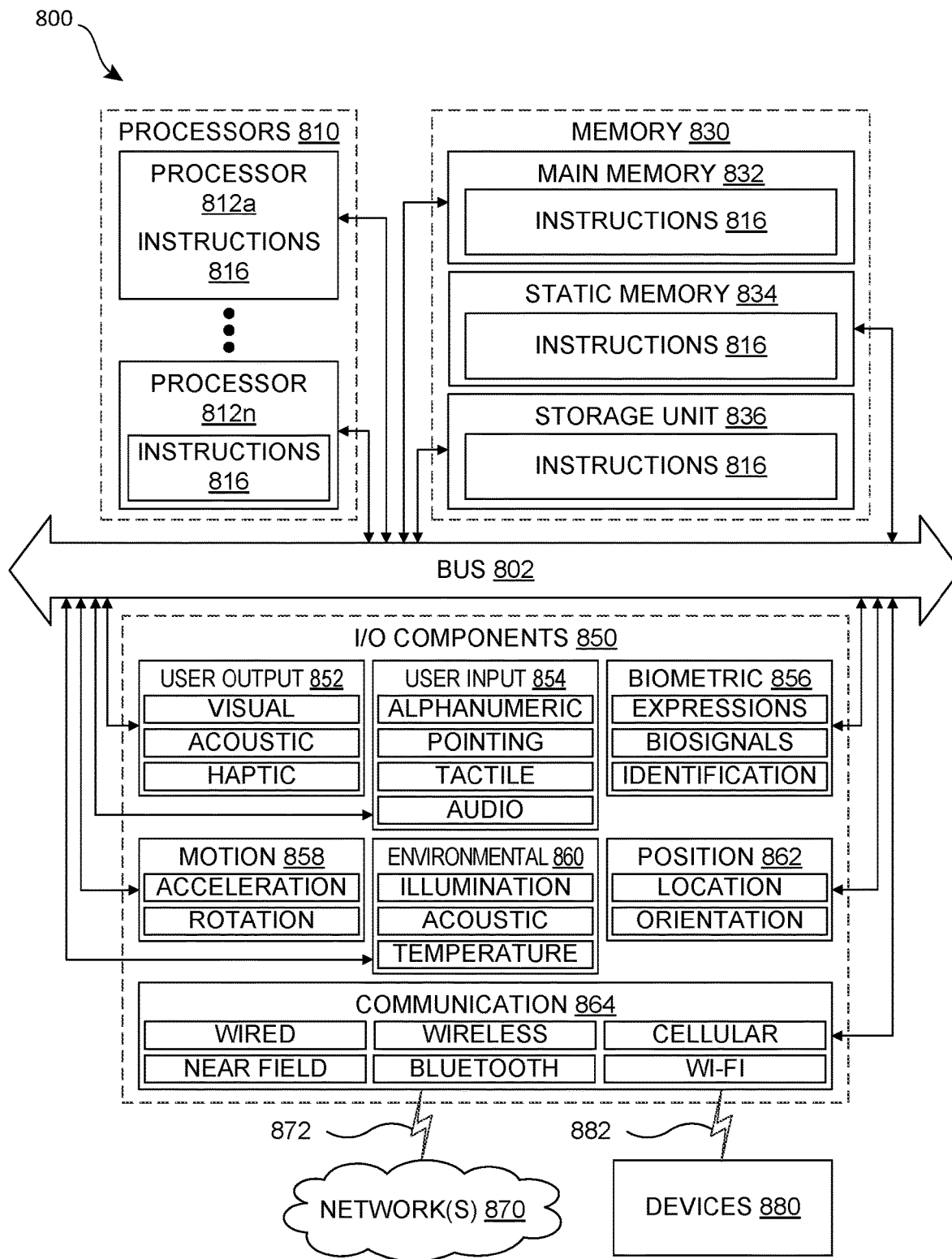
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per sc.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable storage medium storing executable instructions that, when executed, cause the processor to perform operations of:
   obtaining presentation content for a presentation, the presentation content comprising a first set of slides and a transcript of the presentation content, the transcript comprising textual cues for a presenter associated with each slide;
   obtaining presentation style information for the presentation from a presentation datastore, the presentation style information providing an indication of a presentation style to be utilized by a virtual presenter when presenting the presentation content to an audience of the presentation;
   generating a first prompt for a first large language model (LLM) that includes the transcript and the presentation style information to cause the first LLM to generate an augmented transcript by rewriting the textual cues of the transcript into a conversational style associated with the presentation style identified in the presentation style information;
   providing the first prompt as an input to the first LLM to obtain the augmented transcript;
   receiving an indication from a first presentation director interface to begin streaming audiovisual presentation content to a plurality of computing devices of the audience of the presentation;
   generating the audiovisual presentation content by:
     providing the augmented transcript to a text-to-speech model to generate first audio content comprising synthesized speech for the virtual presenter;
     providing the first audio content and a three-dimensional (3D) model of the virtual presenter to a video synthesizer to cause the video synthesizer to generate video content synchronizing first animation content of the virtual presenter with the first audio content; and
     obtaining the video content from the video synthesizer; and
   streaming the audiovisual presentation content comprising the first audio content and the first animation content to the plurality of computing devices of the audience of the presentation.

2. The data processing system of claim 1, wherein the augmented transcript includes emote indicators that signal the video synthesizer to animate the 3D model of the virtual presenter to perform a specified gesture or expression.

3. The data processing system of claim 1, wherein the first LLM is a Generative Pre-trained Transformer model.

4. The data processing system of claim 1, wherein the machine-readable storage medium further includes instructions configured to cause the processor to perform operations of:
   receiving an electronic document comprising first textual content; and
   providing the electronic document to one or more second LLMs trained to receive the first textual content from the electronic document as an input and to output the presentation content.

5. The data processing system of claim 1, wherein the machine-readable storage medium further includes instructions configured to cause the processor to perform operations of:
   obtaining first question content from a first computing device among the plurality of computing devices of the audience during the presentation;
   analyzing the first question content using a natural language processing (NLP) model trained to provide an indication that the first question content includes a question and to refine the first question content to obtain refined question text;
   generating a search query based on the refined question text to search one or more content sources for answer content;
   providing the search query to a search engine to cause the search engine to search for search results;

creating a second prompt for the NLP model including the search results and an instruction to generate a summary of each search result of the search results;
providing the second prompt to the NLP model to obtain the summary of each search result of the search results;
selecting a search result from among the search result as an answer to the first question content; and
sending the first question content and the answer to the plurality of computing devices of the audience.

6. The data processing system of claim 5, wherein the machine-readable storage medium further includes instructions configured to cause the processor to perform operations of:
causing the plurality of computing devices to display the first question content in a chat pane of a user interface, the user interface also including a content pane in which the audiovisual presentation content is presented; and
causing the plurality of computing devices to display the answer to the first question content in the chat pane of the user interface.

7. The data processing system of claim 6, wherein the machine-readable storage medium further includes instructions configured to cause the processor to perform operations of:
determining that the first question content is audio content of speech captured by the first computing device; and
providing the audio content to a speech-to-text conversion model trained to receive the audio content of the speech and output text representing the speech included in the audio content.

8. The data processing system of claim 6, wherein the machine-readable storage medium further includes instructions configured to cause the processor to perform operations of:
pausing streaming of the audiovisual presentation content responsive to obtaining the first question content;
generating audiovisual question content by:
providing the refined question text to the text-to-speech model to generate second audio content comprising synthesized speech for the virtual presenter;
providing the second audio content and the 3D model of the virtual presenter to the video synthesizer to cause the video synthesizer to generate second video content that synchronizes animation of the virtual presenter with the second audio content; and
obtaining the second video content from the video synthesizer; and
streaming the second video content comprising the first audio content and the first animation content to the plurality of computing devices of the audience of the presentation.

9. The data processing system of claim 5, wherein the machine-readable storage medium further includes instructions configured to cause the processor to perform operations of:
analyzing the first set of slides to identify a first image included in the first set of slides;
analyzing the first image using an image-to-text model configured to output a description of a subject matter of the first image; and
including the description of the subject matter of the first image in the first prompt for the first LLM.

10. The data processing system of claim 5, wherein the machine-readable storage medium further includes instructions configured to cause the processor to perform operations of:
prior to sending the first question content and the answer to the plurality of computing devices of the audience, presenting the first question content and the answer on in a chat pane of a user interface of a user device associated with a human moderator;
receiving an indication from a control on the user interface indicating whether the human moderator has accepted or rejected the answer; and
sending the first question content and the answer to the plurality of computing devices of the audience responsive to the human moderator accepting the answer.

11. The data processing system of claim 10, wherein the machine-readable storage medium further includes instructions configured to cause the processor to perform operations of:
receiving an indication from a control on the user interface indicating that a human moderator will take over the presentation;
halting streaming of the audiovisual presentation content comprising the first audio content and the first animation content to the plurality of computing devices of the audience of the presentation;
generating second audiovisual presentation content comprising second audio content and video of the human moderator; and
streaming of the second audiovisual presentation content to the plurality of computing devices of the audience of the presentation.

12. The data processing system of claim 1, wherein the machine-readable storage medium further includes instructions configured to cause the processor to perform operations of:
prior to receiving the indication from a first presentation director interface to begin streaming the audiovisual presentation content, receiving an indication to present the presentation to an artificial-intelligence driven presentation coach;
generating the audiovisual presentation content by:
providing the augmented transcript to the text-to-speech model to generate second audio content comprising synthesized speech for the virtual presenter;
providing the second audio content and the 3D model of the virtual presenter to the video synthesizer to cause the video synthesizer to generate second animation content synchronizing an animation of the virtual presenter with the second audio content; and
obtaining the video content from the video synthesizer;
providing the video content comprising the second audio content and the second animation content to the artificial-intelligence driven presentation coach;
receiving feedback on the presentation from the artificial-intelligence driven presentation coach; and
adjusting one or more parameters associated with the virtual presenter based on the feedback received from the artificial-intelligence driven presentation coach.

13. The data processing system of claim 12, wherein the machine-readable storage medium further includes instructions configured to cause the processor to perform operations of:
receiving feedback on the presentation from the artificial-intelligence driven presentation coach; and
adjusting one or more parameters associated with the virtual presenter based on the feedback received from the artificial-intelligence driven presentation coach.

14. The data processing system of claim 13, wherein the machine-readable storage medium further includes instructions configured to cause the processor to perform operations of:

receiving feedback on the presentation from a human moderator via a chat user interface; and adjusting one or more parameters associated with the virtual presenter based on the feedback received from the artificial-intelligence driven presentation coach.

15. A method implemented in a data processing system for automatically presenting presentation content with a virtual presenter, the method comprising:

obtaining presentation content for a presentation, the presentation content comprising a first set of slides and a transcript of the presentation content, the transcript comprising textual cues for a presenter associated with each slide;

obtaining presentation style information for the presentation from a presentation datastore, the presentation style information providing an indication of a presentation style to be utilized by a virtual presenter;

generating a first prompt for a first large language model (LLM) that includes the transcript and the presentation style information to cause the first LLM to generate an augmented transcript by rewriting the textual cues of the transcript into a conversational style associated with the presentation style identified in the presentation style information;

providing the first prompt as an input to the first LLM to obtain the augmented transcript;

receiving an indication from a first presentation director interface to begin streaming audiovisual presentation content to a plurality of computing devices of an audience of the presentation;

generating the audiovisual presentation content by:

providing the augmented transcript to a text-to-speech model to generate first audio content comprising synthesized speech for the virtual presenter;

providing the first audio content and a three-dimensional (3D) model of the virtual presenter to a video synthesizer to cause the video synthesizer to generate video content synchronizing first animation content of the virtual presenter with the first audio content; and obtaining the audiovisual presentation content from the video synthesizer; and streaming the audiovisual presentation content comprising the first audio content and the first animation content to the plurality of computing devices of the audience of the presentation.

16. The method of claim 15, wherein the augmented transcript includes emote indicators that signal the video synthesizer to animate the 3D model of the virtual presenter to perform a specified gesture or expression.

17. The method of claim 15, wherein the first LLM is a Generative Pre-trained Transformer model.

18. A data processing system comprising:

a processor; and a machine-readable storage medium storing executable instructions that, when executed, cause the processor to perform operations of:

receiving an electronic document comprising first textual content;

automatically analyzing the electronic document using a first large language model (LLM) configured to generate presentation content for a presentation from the electronic document, the presentation content comprising a set of slides and a transcript of the presentation content, the transcript comprising textual cues for a presenter associated with each slide;

obtaining presentation style information for the presentation from a presentation datastore, the presentation style information providing an indication of a presentation style to be utilized by a virtual presenter when presenting the presentation content to an audience of the presentation;

generating a first prompt for a second LLM that includes the transcript and the presentation style information to cause the second LLM to generate an augmented transcript by rewriting the textual cues of the transcript into a conversational style associated with the presentation style identified in the presentation style information;

providing the first prompt as an input to the second LLM to obtain the augmented transcript;

receiving an indication from a first presentation director interface to begin streaming audiovisual presentation content to a plurality of computing devices of an audience of the presentation;

generating the audiovisual presentation content by:

providing the augmented transcript to a text-to-speech model to generate first audio content comprising synthesized speech for the virtual presenter;

providing the first audio content and a three-dimensional (3D) model of the virtual presenter to a video synthesizer to cause the video synthesizer to generate video content synchronizing first animation content of the virtual presenter with the first audio content; and obtaining the video content from the video synthesizer; and streaming the audiovisual presentation content comprising the first audio content and the first animation content to the plurality of computing devices of the audience of the presentation.

19. The data processing system of claim 18, wherein the augmented transcript includes emote indicators that signal the video synthesizer to animate the 3D model of the virtual presenter to perform a specified gesture or expression.

20. The data processing system of claim 18, wherein the second LLM is a Generative Pre-trained Transformer model.

* * * * *